(12) United States Patent
Marhofer et al.

(10) Patent No.: US 6,657,161 B2
(45) Date of Patent: Dec. 2, 2003

(54) EXTERNAL PIPE WELDING APPARATUS

(75) Inventors: William E. Marhofer, Edmonton (CA); Shell Sanford, Jacksonville, TX (US); John Craig, Edmonton (CA); Tim Flynn, Edmonton (CA)

(73) Assignee: O.J. Pipelines Canada, Alberta (CA)

( * ) Notice: Subject to any disclaimer, the term of this patent is extended or adjusted under 35 U.S.C. 154(b) by 0 days.

(21) Appl. No.: 09/960,719

(22) Filed: Sep. 24, 2001

(65) Prior Publication Data

US 2002/0060211 A1 May 23, 2002

(30) Foreign Application Priority Data

Oct. 10, 2000 (CA) .............................................. 2322736

(51) Int. Cl.[7] ................................................. B23K 9/12
(52) U.S. Cl. .............................. 219/125.12; 219/125.11; 219/60 R
(58) Field of Search ....................... 219/125.11, 125.12, 219/60 R

(56) References Cited

U.S. PATENT DOCUMENTS

| | | | |
|---|---|---|---|
| 3,555,239 A | | 1/1971 | Kerth |
| 3,619,552 A | * | 11/1971 | Cape ..................... 219/124.34 |
| 3,737,614 A | | 6/1973 | Paulange |
| 3,777,115 A | * | 12/1973 | Kazlauskas et al. ... 219/124.34 |
| 3,806,694 A | * | 4/1974 | Nelson et al. ......... 219/124.31 |
| 4,005,305 A | | 1/1977 | Nelson et al. |
| 4,005,308 A | * | 1/1977 | Chaney et al. ........... 219/124.5 |
| 4,019,016 A | | 4/1977 | Friedman et al. |
| 4,144,992 A | * | 3/1979 | Omae et al. ................. 228/102 |
| 4,163,886 A | | 8/1979 | Omae et al. |
| 4,248,371 A | | 2/1981 | Melton |
| 4,260,869 A | | 4/1981 | Slavens et al. |
| 4,331,278 A | | 5/1982 | Sherer et al. |
| 4,368,375 A | | 1/1983 | Merrick et al. |
| 4,371,105 A | | 2/1983 | Melton |
| 4,373,125 A | | 2/1983 | Kazlauskas |

(List continued on next page.)

FOREIGN PATENT DOCUMENTS

| | | |
|---|---|---|
| EP | 0 983 816 A2 | 3/2000 |
| GB | 2 159 748 A | 12/1985 |
| GB | 2 274 420 A | 7/1994 |

OTHER PUBLICATIONS

Brochure re: Veraweld, computer controlled, high deposition, multi–purpose, automated welding system published by Vermaat Technics, Inc., Palm Coast, Florida 32135, U.S.A., date unknown. 6 pages.

(List continued on next page.)

*Primary Examiner*—M. Alexandra Elve
*Assistant Examiner*—Kevin McHenry
(74) *Attorney, Agent, or Firm*—Arent Fox Kintner Plotkin & Kahn, PLLC

(57) ABSTRACT

The invention relates to the field of automated welding, and more particularly, to an automated, gas metal arc welding apparatus for externally welding abutting sections of pipe. The apparatus has a motorized main carriage for travelling circumferentially about one of the pipe sections to be welded. The apparatus is provided with a welding torch which is connected to the main carriage. The welding torch is movable relative to the main carriage by the actuation of a multi-axis drive mechanism. The multi-axis drive mechanism has a horizontal transport mechanism for linearly translating the torch transversely of the weld seam, a vertical transport mechanism for vertically displacing the torch transversely of the weld seam and an angular transport mechanism for pivotally moving the torch transversely of the weld seam. A controller is provided for actuating the various transport mechanisms individually or simultaneously if desired.

18 Claims, 18 Drawing Sheets

U.S. PATENT DOCUMENTS

| | | | |
|---|---|---|---|
| 4,556,777 A | * 12/1985 | Sarugaku et al. | 219/124.34 |
| 4,631,386 A | * 12/1986 | Slavens | 219/125.12 |
| 4,635,839 A | 1/1987 | Slavens | |
| 4,645,902 A | 2/1987 | Hayakawa | |
| 4,658,112 A | 4/1987 | Thompson | |
| 4,841,123 A | * 6/1989 | Novak et al. | 219/125.12 |
| 4,857,701 A | 8/1989 | Slavens | |
| 4,996,409 A | * 2/1991 | Paton et al. | 219/130.01 |
| 5,059,765 A | 10/1991 | Laing | |
| 5,148,000 A | 9/1992 | Tews | |
| 5,227,601 A | 7/1993 | Black | |
| 5,347,101 A | 9/1994 | Brennan et al. | |
| 5,534,676 A | 7/1996 | Rinaldi et al. | |
| 5,571,431 A | 11/1996 | Lantieri et al. | |
| 5,593,605 A | 1/1997 | Jones | |
| 5,796,068 A | 8/1998 | Jones | |
| 5,796,069 A | 8/1998 | Jones et al. | |
| 5,932,123 A | 8/1999 | Marhofer et al. | |

OTHER PUBLICATIONS

Brochure re: LH Comet MK 2, welding system, published by LH and Associates (UK) Ltd., United Kingdom, date unknown. 2 pages.

Web Pages from www.bugo.com, re:Bug–O Systems, A Division of Weld Tooling Corporation, Pittsburgh, Pennsylvania 15204–1899, U.S.A., date unknown. 29 pages.

Web Pages from www.magnatech–lp.com, re: Magnatech, A Limited Partnership, East Granby, Connecticut 06026, U.S.A., date unknown. 6 pages.

Web Pages from www.crc–evans.com/division/autoweld/process/bot.html, re: CRC–Evans Automatic Welding, A Division of CRC–Evans Pipeline International, Inc., Houston, Texas 77086, U.S.A., date unknown. 15 pages.

Web Pages from www.vermaat–technics.nl, re:Vermatt Technics BV, Houston, Texas 77086, U.S.A., date unknown. 10 pages.

Patent Abstracts of Japan; vol. 5, No. 18 (M–053), Feb. 3, 1981; Publication No. 55–147496; Publication Date Nov. 17, 1980.

* cited by examiner

EXTERNAL PIPE WELDING APPARATUS

FIELD OF THE INVENTION

The invention relates to the field of automated welding, and more particularly, to an automated, gas metal arc welding apparatus for externally welding abutting sections of pipe.

BACKGROUND OF THE INVENTION

Pipelines such as those used for the conveyance of oil or water are constructed by welding sections of pipe together. Often, the welding activities will be carried out by automated welding systems at the installation site of the pipeline. In some instances, automated welding systems capable of being moved along the pipeline right-of-way may be used.

Such mobile automated welding systems may comprise a welding carriage and a welding assembly, which includes a torch suitable for Gas Metal Arc Welding (GMAW). The welding carriage is adapted to carry the welding assembly around an annular track or guide mounted externally about one of the pipe sections. Typically, the welding carriage will have a motor for driving the carriage on the guide.

In the field, a variety of welding situations may present themselves. For example, the pipe sections to be welded may have large-angled bevels resulting in broad weld grooves. Conversely, other pipes having deep, thick sections will require that the weld be performed along a narrow weld seam. A flexible welding system is sought that is adaptable to such diverse conditions such that the welding operation can be effected with a single, mobile, apparatus. In addition, the welding system should be flexible enough to enable a substantially constant heat input to the weld.

SUMMARY OF THE INVENTION

In an aspect of the invention there is an apparatus for welding abutting pipe sections along a weld seam, the apparatus comprising: a motorized main carriage for travelling circumferentially about one of the pipe sections to be welded; a welding torch connected to the main carriage, the welding torch being movable relative to the main carriage; a first motorized transport mechanism connected to the main carriage for vertically displacing the welding torch relative to the weld seam; and a second motorized transport mechanism connected to the main carriage for pivotally moving the welding torch transversely of the weld seam.

In an additional feature of the invention the apparatus includes a controller for actuating the second transport mechanism so as to pivotally oscillate the welding torch transverse of the weld seam. In yet another additional feature, the controller actuates the first and the second transport mechanisms simultaneously so as to change the vertical position of a pivoting point of the torch in accordance with a pre-determined trajectory. In still another additional feature, the controller receives feedback as to a welding current, a welding voltage and actuates the first transport mechanism so as to effect a predetermined minimum heat input into the weld seam. In a further additional feature, the controller prioritizes the function of effecting said pre-determined minimum heat input over the function of following said pre-determined trajectory for the pivoting point of the torch.

In another additional feature, the apparatus further comprises a third motorized transport mechanism connected to the main carriage for linearly translating the welding torch transversely of the weld seam. In yet another additional feature, the apparatus includes a controller for activating the third transport mechanism so as to linearly oscillate the welding torch transverse of the weld seam. In still another additional feature, the controller is operable to actuate the first, the second and the third transport mechanisms simultaneously in order to effect a pre-determined trajectory and angular orientation of the torch relative to one of the vertical or transverse directions.

In another aspect of the invention, there is an apparatus for welding abutting pipe sections along a weld seam, the apparatus comprising: a motorized main carriage for travelling circumferentially about one of the pipe sections to be welded; a welding torch connected to the main carriage; the torch being movable relative to the main carriage; a first motorized transport mechanism connected to the main carriage for linearly translating the torch transversely of the weld seam; and a second motorized transport mechanism connected to the main carriage for pivotally moving the torch transversely of the weld seam.

In an additional feature of the invention, the apparatus includes a controller for actuating the second transport mechanism so as to oscillate the torch about a pivot point, transverse of the weld seam; and for actuating the first transport mechanism so as to linearly translate the pivot point transverse of the weld seam. In yet another additional feature, the first transport mechanism includes: a carriage connected to the welding torch, a motor for providing a driving force to effect linear translation of the welding torch; and a frame for supporting the motor. The frame is fixed to the main carriage. The carriage is slidably mounted to the frame and translatable relative to the main carriage in a direction transverse of the weld seam. In still another additional feature, the carriage has guide means fixed thereto. The guide means are slidably mounted to the frame. In a further additional feature the first transport assembly includes driving means interconnecting the motor and the carriage. In yet another additional feature the driving means include: a cog rotatably mounted to the motor for transmitting the driving force of the motor; a cog pulley rotatably connected to the cog and mounted to extend through the frame, the cog pulley including a threaded shaft rotatable about the frame; and a nut fixed to the carriage for threadingly engaging the shaft. The cog pulley is adapted to receive the driving force of the motor and to rotate the shaft. The nut is adapted is to travel along the shaft when the motor is actuated to thereby urge the carriage to translate transversely of the weld seam.

In another additional feature, the second transport assembly includes: a frame connected to the main carriage; a mount for carrying the welding torch; a motor for providing a driving force to effect pivotal motion of the welding torch, the motor being fixed to the frame; an eccentric cam connected to the motor; and a cam follower disposed intermediate the cam and the mount and pivotally attached to the frame. The cam follower is adapted to receive the driving force from the motor such that when the motor is actuated the cam follower is urged to rotate about the frame thereby causing the welding head to move pivotally in a direction transverse of the weld seam.

In yet another additional feature the second transport assembly includes: a frame connected to the main carriage; a mount for carrying the welding torch; a motor for providing a driving force to effect pivotal motion of the welding torch, the motor being fixed to the frame; an eccentric cam connected to the motor; and a cam follower disposed intermediate the cam and the mount and pivotally attached to the frame. The cam follower is adapted to receive the driving force from the motor such that when the motor is actuated the cam follower is urged to rotate about the frame thereby causing the welding head to move pivotally in a direction transverse of the weld seam.

In still another additional feature the second transport mechanism includes: a frame connected to the main carriage; a mount for carrying the welding torch; a motor for providing a driving force to effect pivotal motion of the welding torch, the motor being fixed to the frame; and a gear train connected to the motor. The mount is pivotally attached to the frame. The gear train is adapted to transmit the driving force from the motor to the mount to cause the welding head to move pivotally transverse of the weld seam.

In a yet another additional feature, the apparatus further comprises a third motorized transport mechanism connected to the main carriage for vertically displacing the welding torch relative to the weld seam. In a further additional feature, the controller is operative to actuate the first, second and third transport mechanisms simultaneously in order to effect a pre-determined trajectory and angular orientation of the torch relative to one the vertical or transverse directions. In still another additional feature the controller receives feedback as to a welding current and welding voltage and actuates the third transport mechanism so as to effect a pre-determined minimum heat input into the weld seam. In yet another additional feature the controller prioritizes the function of effecting said pre-determined minimum heat input over the function of following said predetermined trajectory for the pivoting point of the torch. In still another additional feature the third transport mechanism includes: a carriage connected to the welding torch, a motor for providing the driving force to effect the vertical displacement of the welding torch, and a frame for supporting the motor, the frame being connected to the main carriage. The carriage is slidably mounted to the frame and vertically translatable relative to the main carriage in a direction perpendicular to the pipe sections to be welded. In yet another additional feature the carriage has guide means fixed thereto, the guide means being slidably mounted to the frame. In still another additional feature, the third transport assembly includes driving means interconnecting the motor and the carriage. In a further additional feature, the driving means include: a cog rotatably mounted to the motor for transmitting the driving force of the motor; and a cog pulley rotatably connected to the cog and mounted to extend through the frame. The cog pulley includes a threaded shaft rotatable about the frame. The carriage has a threaded bore. The bore is adapted to receive the threaded shaft. The co pulley is adapted to receive the driving force of the motor and to rotate the shaft within the bore. The carriage is adapted to travel vertically along the shaft when the motor is actuated.

In another additional feature, the first transport mechanism has a motor-driven carriage that is translatable relative to the main carriage in a direction transverse of the weld seam. The frame of the third transport assembly is fixed to the carriage of the first transport assembly. In yet another additional feature, the second transport assembly has a frame and a mount connected thereto to support the welding torch. The frame of the second transport assembly is pivotally connected to the carriage of the third transport assembly.

In another additional feature, the frame of the third transport assembly is fixed to the main carriage; and the first transport mechanism has a motor-driven carriage that is translatable relative to the main carriage in a direction transverse of the weld seam. The carriage of the first transport assembly is fixed to the frame of the third transport assembly. In still another additional feature, the second transport assembly has a frame and a mount connected thereto to support the welding torch. The frame of the second transport assembly is pivotally connected to the carriage of the first transport assembly.

In yet another additional feature of the invention, the apparatus further comprises a retracting mechanism for rotating the welding torch away from the weld seam. The retracting mechanism includes a clamp for securing the welding head in position.

BRIEF DESCRIPTION OF THE DRAWINGS

For a better understanding of the present invention and to show more clearly how it may be carried into effect, reference is now made, by way of example and not of limitation, to the accompanying drawings in which:

FIG. 13 is a view of the pipe welding apparatus, similar to that shown in

FIG. 12, showing the welding head in a retracted, non-operational position;

DETAILED DESCRIPTION OF ILLUSTRATIVE EMBODIMENTS OF THE INVENTION

Figure 1:
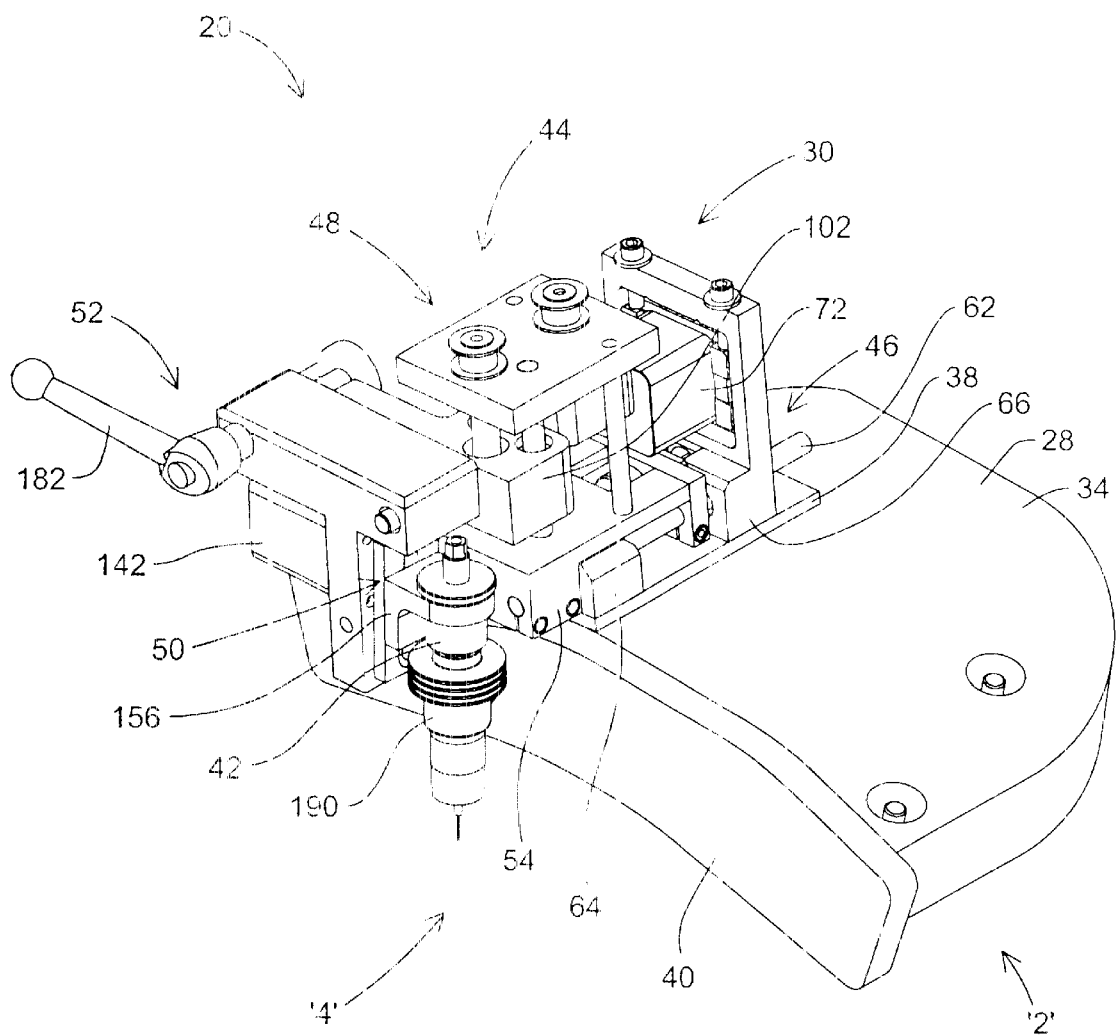
FIG. 1 is a perspective view of a pipe welding apparatus according to a first embodiment of the invention, showing a single welding assembly supported on a main welding carriage.

The description which follows, and the embodiments described therein, are provided by way of illustration of an example or examples of particular embodiments which reflect the principles of the present invention. These examples are provided for the purposes of explanation, and not of limitation, of those principles and of the invention. In the description which follows, like parts are marked throughout the specification and the drawings with the same respective reference numerals.

Referring to FIGS. 1 through 6, in a first embodiment of the invention, a pipe welding apparatus, generally indicated as 20, is operable to weld a first pipe section 22 to an adjoining second pipe section 24 along an annular weld joint, groove or seam 26 (seen best in FIG. 2) using the Gas Metal Arc Welding (GMAW) process. The pipe welding apparatus 20 comprises a motor-driven, main welding carriage 28 and a welding assembly 30 carried thereon.

In a typical installation of the pipe welding apparatus 20, the main carriage 28 is mounted on an annular band, track or guide 32 which is supported about the first pipe section 22. The guide 32 extends about the outer circumference of the first pipe section 22 and serves as a rail to direct and constrain the circumferential travel of the main carriage 28 about the first pipe section 22. The main carriage 28 has a driving pinion (not shown) which meshes with a toothed rack (not shown) of the guide 32, thereby providing a means for guiding the main carriage 28 around the first pipe section 22. The travel speed of the main carriage 28 is electronically controlled and travel along the track 32 is permissible in both clockwise and counter-clockwise directions thereby obviating the need for dedicated left-hand and right-hand machines. The pipe welding apparatus 20 may include a sensor (not shown) mounted thereto for determining the circumferential position of the welding assembly 30 on the first pipe section 22.

The main carriage 28 has a generally arcuately shaped base 34 (seen best in FIG. 1) for facilitating travel about the first pipe section 22. A frame 36 (seen best in FIG. 2) is mounted to the base 34 for supporting the welding assembly 30. The frame 36 is comprised of a first plate 38 disposed generally parallel to the base 34 and a second plate 40 fixed along one side of the base 34 so as to carry the first plate 38 clear of the base 34. The welding assembly 30 is mounted on the first plate 38.

The welding assembly 30 comprises a welding head 42 and an electronically controlled, multi-axis drive mechanism 44 for moving the welding head 42 relative to the weld seam 26. The multi-axis drive mechanism 44 comprises:

(a) a horizontal transport assembly 46 for linearly translating the welding head 42 in a direction transverse of the weld seam 26;

(b) a vertical transport assembly 48 for displacing the welding head 42 perpendicular to the first pipe section 22 so as to adjust the proximity of the welding head 42 to the weld seam 26; and (c) an angular transport assembly 50 for pivotally oscillating the welding head 42, in a pendulum style motion, transverse of the weld seam 26.

Each transport assembly may be operated independently of the other. The welding assembly 30 also has a manually-operated retracting mechanism 52 for pivoting the welding head 42 away from the weld seam 26. Each of these mechanisms will now be described in greater detail.

Figure 2:
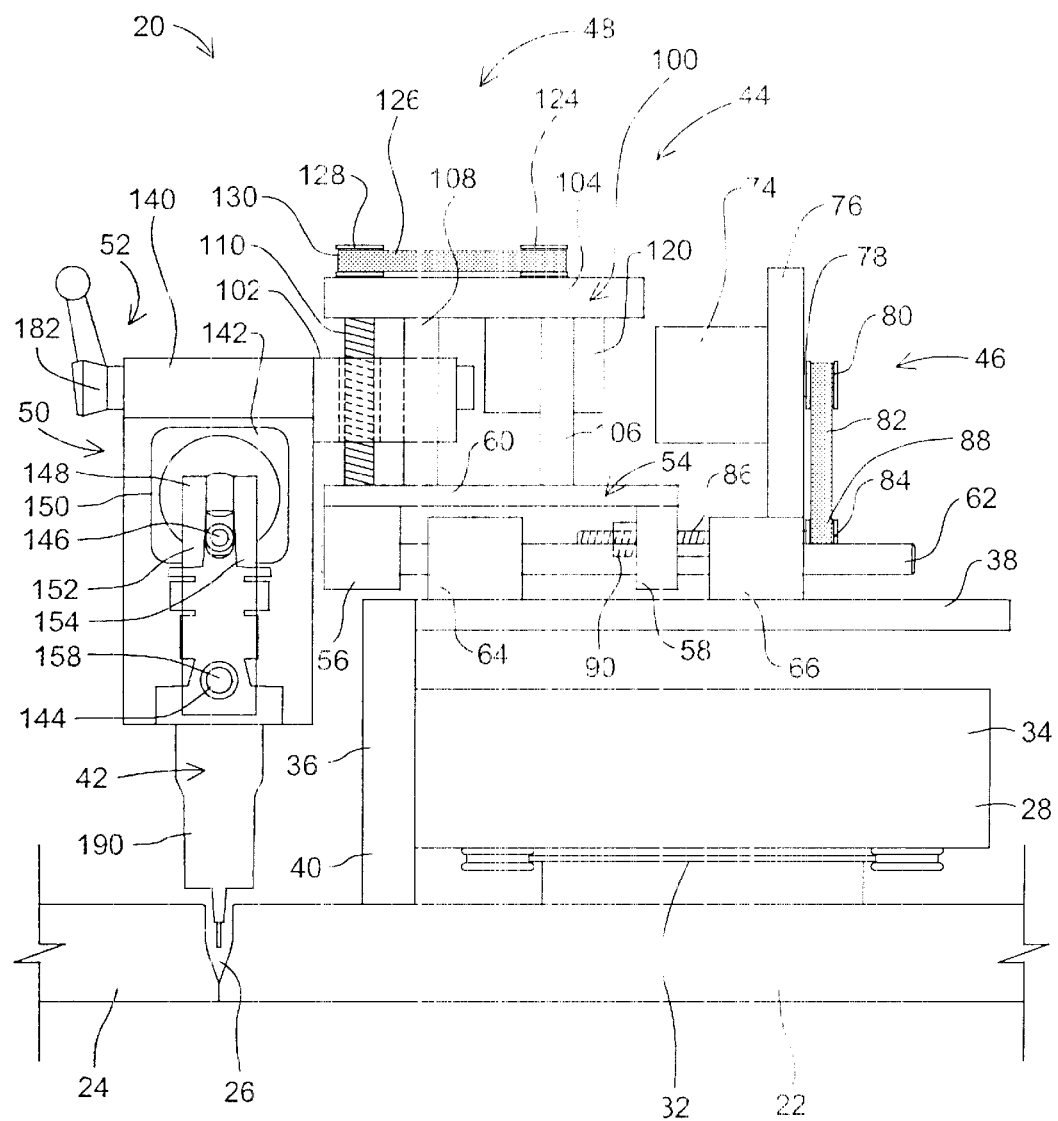
FIG. 2 is an elevational view of the pipe welding apparatus of FIG. 1 taken in the direction of arrow "2", showing a typical installation of the pipe welding apparatus on a first pipe section.
Figure 3:
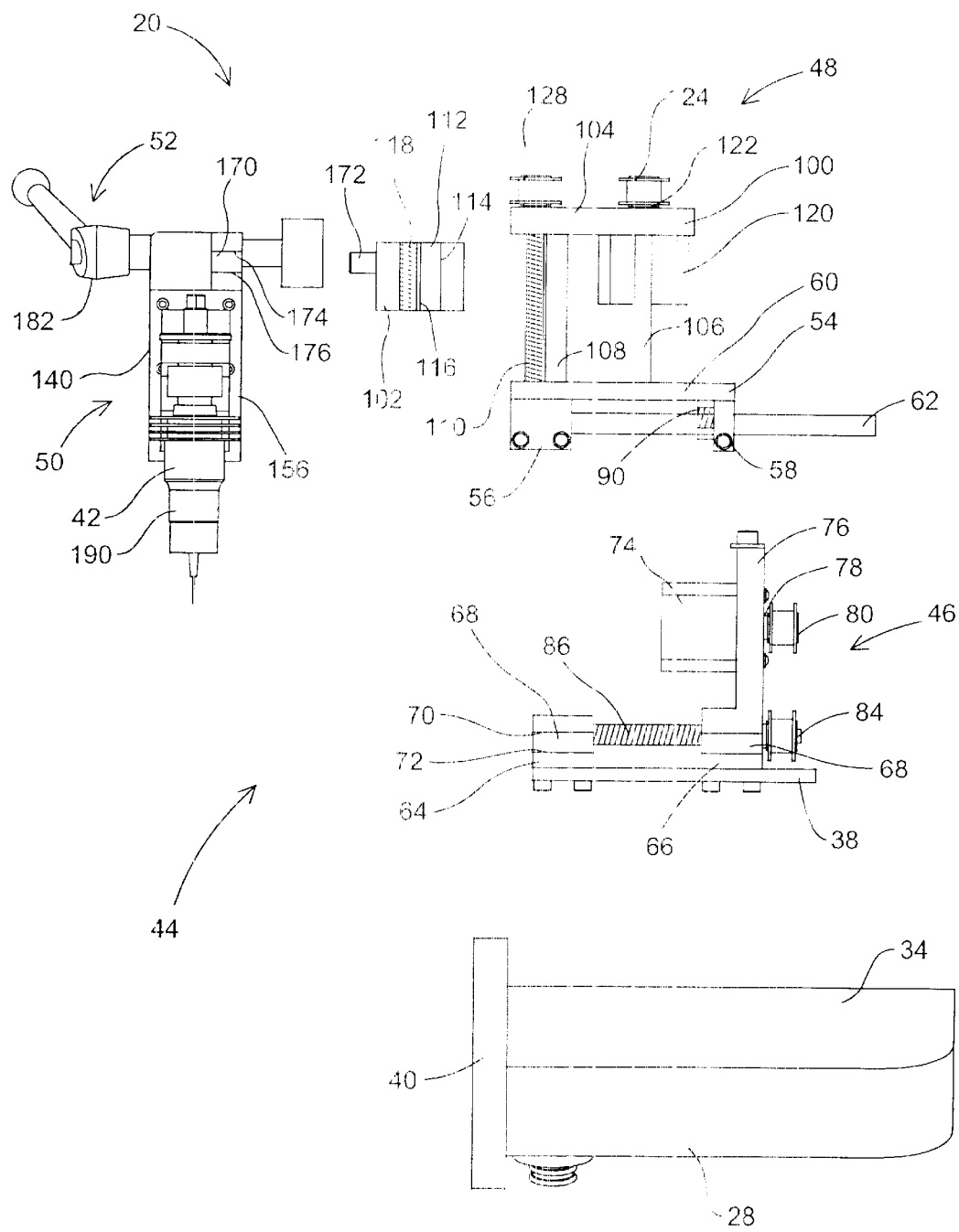
FIG. 3 is a partially exploded view of the pipe welding apparatus, similar to that shown in FIG. 2.

Referring particularly to FIGS. 2 and 3, the horizontal transport assembly 46 has a motor-driven carriage 54 which is movable relative to the main carriage 28 in a direction that is generally transverse of the weld seam 26. The carriage 54 has a pair of opposed mounting blocks 56 and 58 which support a plate 60 extending therebetween. The mounting blocks 56 and 58 fixedly retain a cylindrical guide member or rod 62 that is disposed generally parallel to the plate 60. However, the guide rod 62 is slidably mounted to a pair of mounting blocks 64 and 66 that are anchored to the first plate 38 of frame 36 thereby securing the horizontal transport assembly 46 to the main carriage 28. Each mounting block 64, 66 has a bore 68 defined therein located to receive the guide rod 62 therethrough. The bore 68 has a bushing 70 and bearings 72 mounted thereabout to permit the guide rod 62 to slide within the mounting blocks 64 and 66 when the horizontal transport assembly 46 is actuated.

An electronically controlled motor 74 drives the carriage 54 relative to the main carriage 28. The motor 74 is mounted to a structure 76 that is fixedly connected to the mounting block 66. The motor 74 has an output shaft 78 onto which a cog 80 is mounted. The cog 80 has projections (not shown) such as ribs which engage corresponding projections (not shown) on the underside of a band or belt 82. The belt 82 is connected to a second cog 84 which is mounted to a threaded shaft 86 that is fitted through the structure 76. The belt 82, the second cog 84 and the threaded shaft 86 co-operate to form a cog pulley 88. Through this arrangement the threaded shaft 86 is precluded from translational movement relative to the main carriage 28 but is permitted rotational motion. A threaded nut 90 which is fixedly connected to the guide rod 62 and the mounting block 58 is adapted to receive, and threadingly engage, the shaft 86, thereby forming a recirculating ball-screw mechanism, known to those skilled in the art. As will be explained in greater detail below, this mechanism when actuated will urge the carriage 54 to translate in a direction transverse to the weld seam 26.

Actuating the motor 74 causes the belt-driven shaft 86 to rotate. As the shaft 86 rotates, its threading engages the counterpart threading of the nut 90. Since the shaft 86 is constrained to only a rotational motion, the nut 90 is urged to travel along shaft 86. Given that the nut 90 is fixed to the guide rod 62, as the nut 90 travels along the shaft 86 the guide rod 62 is urged to slide within the bore 68 of the mounting blocks 64 and 66, thereby causing the carriage 54 to translate in a direction transverse of the weld seam 26.

As the horizontal transport assembly 46 controls the linear translation of the welding head 42 it can thus impart an oscillatory side-to-side movement or shuttle-type motion to the welding head 42 transverse of the welding seam 26. As will be appreciated by those skilled in the art, this type of oscillatory motion is particularly useful when welding pipe sections that have relatively large angled bevels. In such cases, the welding head 42 can be moved to effectively bridge the gap which results from a wider welding seam, thereby reducing the number of weld passes required to achieve a strong weld.

Referring particularly to FIGS. 2 and 3, the vertical transport assembly 48 is supported on the carriage 54 of the horizontal transport assembly 46. The assembly 48 comprises a structural frame 100 and a motor-driven carriage block 102 which imparts vertical motion to the welding head 42 relative to the first pipe section 22. The structural frame 100 comprises a plate 104 which is generally parallel to the plate 60 of the carriage 54 and a transverse member 106 for supporting plate 104. A cylindrical guide member or rod 108 and a threaded shaft 110 are mounted so as to extend between plates 60 and 104 of the horizontal and vertical transport assemblies 46 and 48, respectively.

The carriage block 102 has a first bore 112 defined therein located to receive guide rod 108 therethrough. The bore 112 has a bushing 114 and bearings 116 mounted thereabout to permit the carriage block 102 to slide along the guide rod 108 when the vertical transport assembly 48 is actuated. The carriage block 102 also has a second threaded bore 118 which is adapted to receive and threadingly engage the shaft 110. As will be explained in greater detail below, the guide rod 108 and the shaft 110 co-operate to translate the carriage block 102 relative to the main carriage 28 in a direction that is perpendicular to first pipe section 22.

An electronically-controlled motor 120 is secured to the structural frame 100. The motor 120 has an output shaft 122 which extends through the plate 104 and is connected to a cog 124. Projections (not shown) such as ribs on the cog 124 engage corresponding projections (not shown) on the underside of a band or belt 126 which is connected to a second cog 128 that, in turn, is mounted to the threaded shaft 110. Belt 126, second cog 128 and threaded shaft 110 co-operate to form a cog pulley 130. Through this arrangement, the threaded shaft 110 is precluded from translational movement in a direction perpendicular to the first pipe section 22, but is permitted to rotate in place.

Actuating the motor 120 causes the belt-driven threaded shaft 110 to rotate. As the shaft 110 rotates, its threading engages the counterpart threading of second bore 118. Since the threaded shaft 110 is constrained to only a rotational motion, the carriage block 102 is urged to travel along the threaded shaft 110 and slide along the guide rod 108. The welding head 42 is thus urged to move in a direction generally perpendicular to first pipe section 22. In this manner, the vertical transport assembly 48 can be used to control the vertical position of the welding head 42 relative to the weld seam 26. The contact-to-work offset of the tip of the welding head 42 relative to the weld seam 26 may thus be adjusted as required for the welding process.

Figure 6:
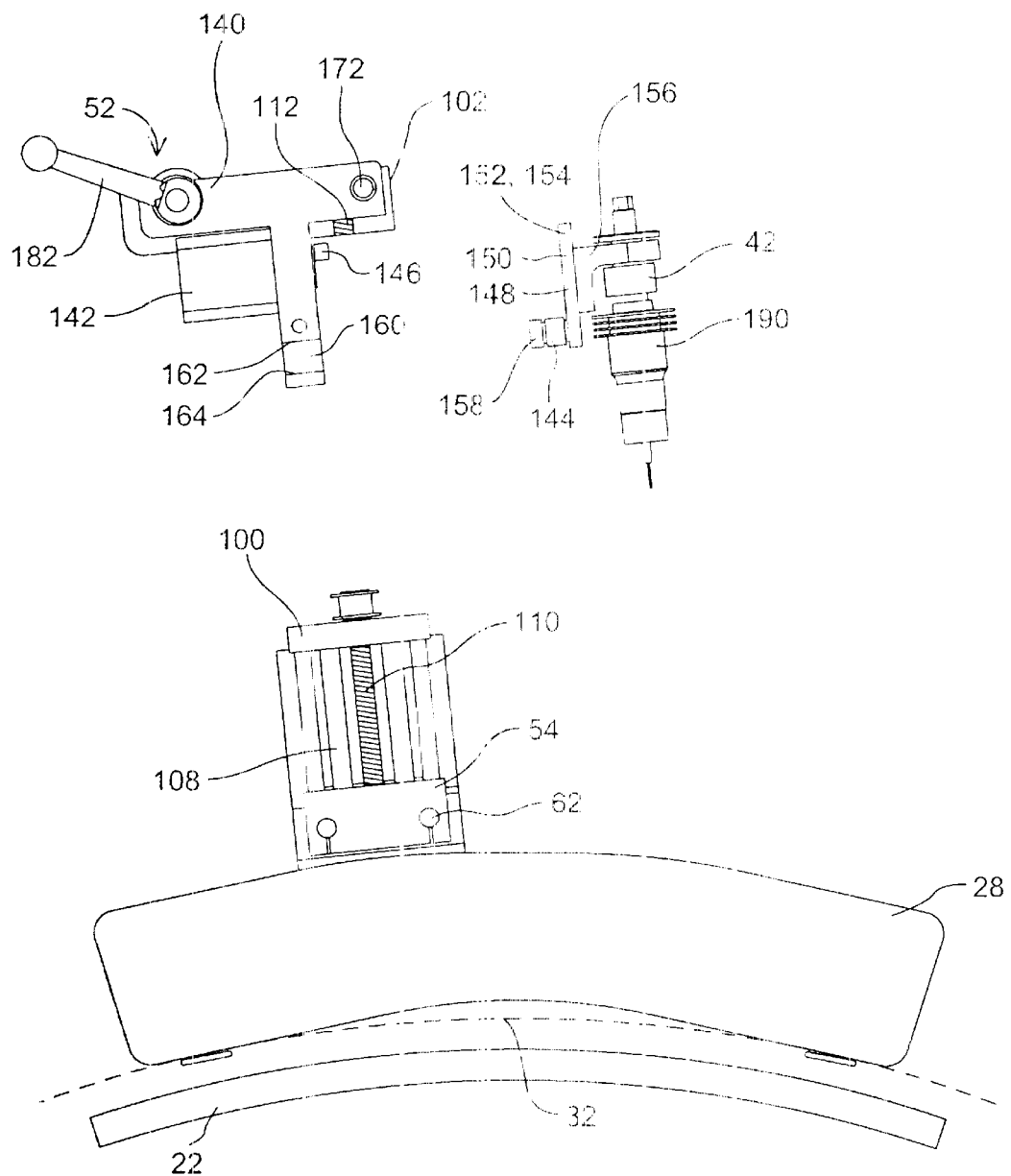
FIG. 6 is a partially exploded view of the pipe welding apparatus, similar to that shown in FIG. 4.

Referring particularly to FIGS. 2 and 6, the angular transport assembly 50 comprises a frame 140 which is pivotally mounted on the carriage block 102 of the vertical transport assembly 48. An electronically-controlled motor 142 is mounted to the frame 140 for driving the pivotal oscillation of the welding head 42 about a pivot 144. More specifically, the motor 142 drives a cam 146 eccentrically mounted on the motor relative to its drive shaft (not shown). The cam 146 engages a cam follower 148 which comprises a yoke 150 having a pair of arms 152 and 154. A mount or bracket 156 is fixed to the yoke 150 and carries the welding head 42. The yoke 150 also has a shaft or pin 158 which extends perpendicular to the yoke 150 to be received in a bore 160 defined in the frame 140. The bore 160 of the frame 140 has a bushing 162 and bearings 164 mounted thereabout to permit the rotation of the pin 158 therewithin. As will be understood by those skilled in the art, the foregoing arrangement forms the pivot 144 about which the welding head 42 will oscillate when the angular transport assembly 50 is actuated.

Actuating the motor 142 causes the cam 146 to rotate. This rotational motion is transferred to yoke 150 through its arms 152 and 154. As the yoke 150 follows the movement of the cam 146, the pin 158 is urged to rotate within the bore 160, causing the yoke 150 to adopt an angular motion relative to the pivot 144. This causes the welding head 42 to travel along an arcuate path in a direction generally transverse of weld seam 26.

During a typical operation of the pipe welding apparatus 20, the angular transport assembly 50 may be actuated to urge the welding head 42 to pivotally oscillate transversely of the weld seam 26 with a pendulum-like motion. As will be appreciated by those skilled in the art, this type of oscillatory movement may be particularly useful when welding thick, heavy pipes having a deep, narrow weld bevel, as it allows the arc generated by the welding head 42 to reach the bottom of the weld seam 26. This tends to create better penetration in the weld area and discourage the occurrence of non-fusion defects at the bottom of the weld seam 26. Consequently, fewer repairs may be required during the welding process.

The rate and velocity profile (speed and/or direction of motion at any point during an oscillation period) parameters of the oscillatory motion of the welding head 42 may be electronically adjusted to suit a particular welding situation. The oscillation width or radial angle may be varied incrementally during the welding operation. In addition, the angular transport assembly 50 may also have oscillation dwell capabilities which would allow the welding head 42 to dwell or pause in a pre-selected position in its arcuate path for a predetermined period of time.

The pipe welding apparatus 20 may also be provided with a weld seam tracking system (not shown). This system could be operable to sense the position of the welding head 42 relative to the weld seam 26 and to maintain oscillation of the welding head 42 centered in the weld seam 26.

During a typical operation of the pipe welding apparatus 20, the horizontal and angular transport assemblies 46 and 50, respectively, may be actuated individually, sequentially, or simultaneously, i.e., in combination one with the other. The pipe welding apparatus 20 is thus easily adaptable to different welding situations and capable of handling a variety of weld preparation groove geometries. For instance, where the weld seam is wide, shuttle-type oscillation may be used to ensure that the weld gap is properly bridged. Alternatively, the pipe welding apparatus can accommodate a narrow weld seam by switching to pivotal oscillation to maximize tip penetration in the weld seam. The combined use of the transport assemblies 46 and 50 can provide added versatility to the automated welding process and may permit the pipe welding apparatus 20 to more closely simulate the motion profile of a manually-controlled and operated welding head. Simultaneous or synchronized actuation of the transport assemblies 46 and 50 may generate more complex welding head motion profiles as the linear, shuttle-type motion is combined with the pivotal oscillating motion. Notably, shuttle-type oscillation can be used to horizontally displace the pivot point about which the welding head 42 is oscillated. The extent to which motion of the welding head 42 can be controlled also enables a single pipe welding apparatus 20 to perform multi-stage welding procedures which have conventionally been performed by several different welding machines (e.g., dedicated "root-pass", "fill-pass" and "cap-pass" machines).

Likewise, the vertical and angular transport assemblies 48 and 50 can be actuated simultaneously to vertically displace the pivot point about which the welding head 42 oscillates. In this way, the arcuate path or trajectory of the welding head 42 can be modified or altered for increased versatility. Raising the pivot point relative to the first pipe section 22 during oscillation will produce a more pronounced curving trajectory for the welding head 42. Conversely, lowering the pivot point relative to the first pipe section 22 during oscillation will tend to flatten out the trajectory of the welding head 42.

It is also possible to actuate the three transport mechanisms 46, 48 and 50 in combination one with the other. For example, the horizontal and the vertical transport mechanisms 46 and 48, respectively can be actuated to displace the pivot point while the angular transport mechanism 50 operates to oscillate the welding head 42.

Figure 4:
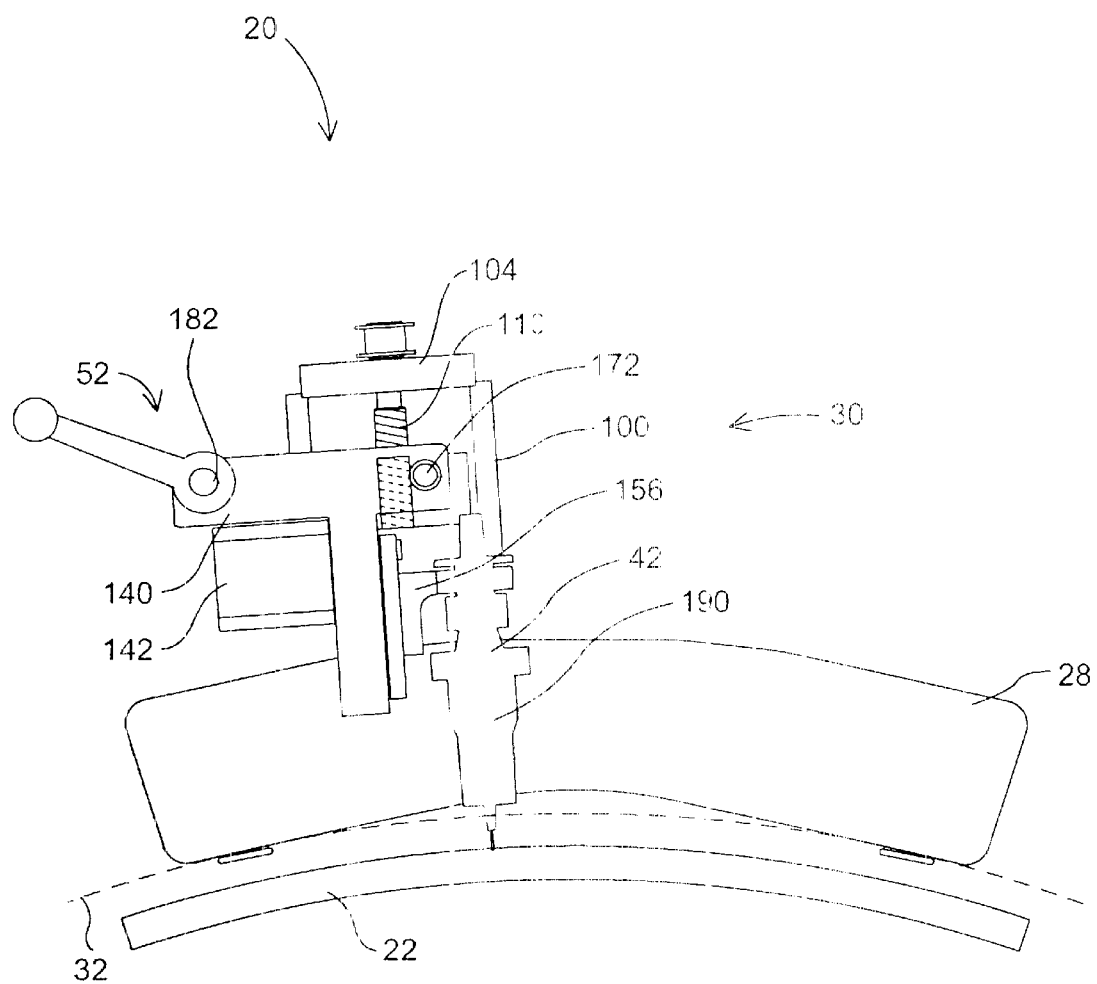
FIG. 4 is an elevational view of the pipe welding apparatus of FIG. 1 taken in the direction of arrow "4", showing a welding head in an operational position.
Figure 5:
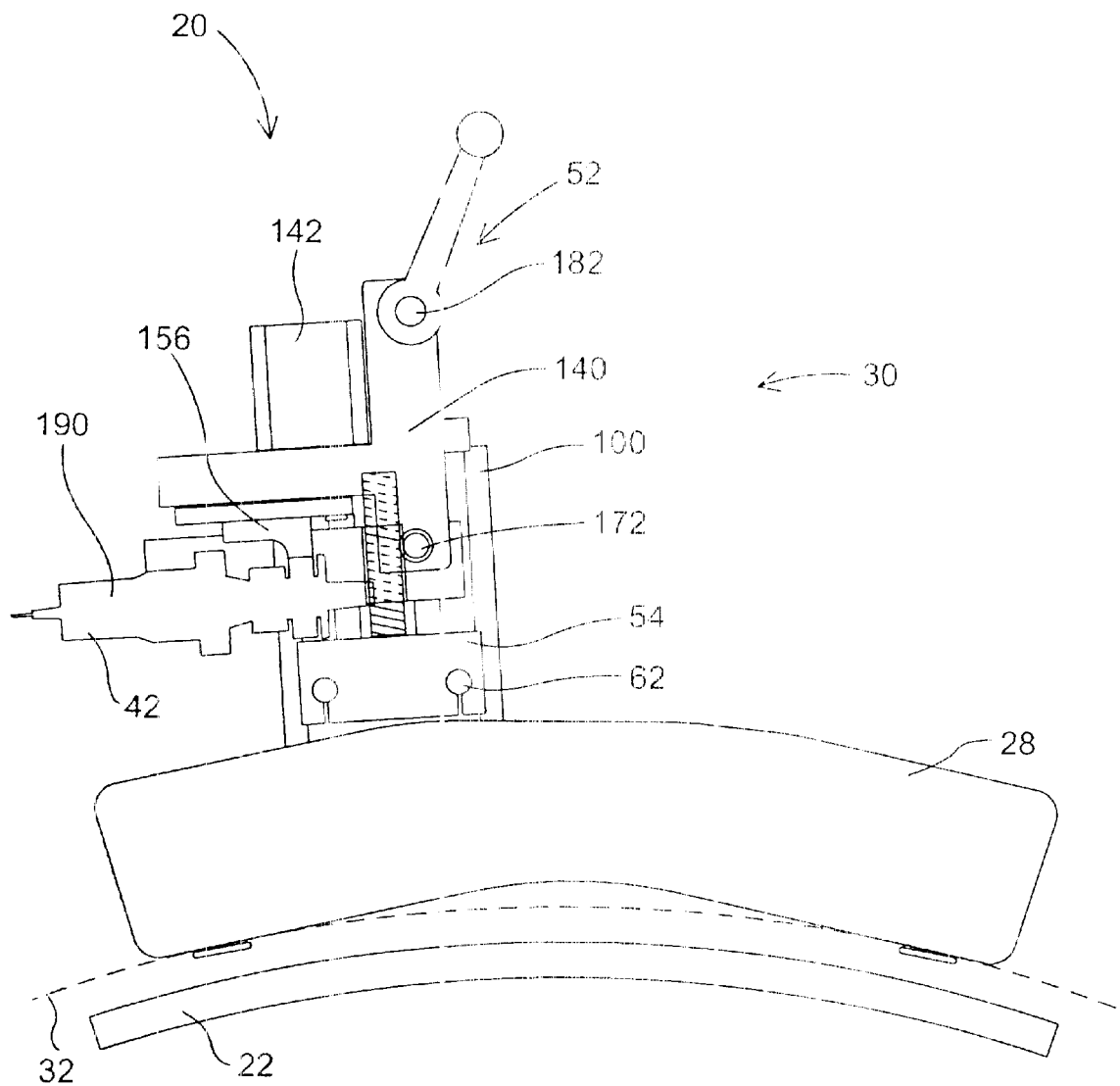
FIG. 5 is a view of the pipe welding apparatus, similar to that shown in FIG. 4, showing the welding head in a retracted, non-operational position.

The retracting mechanism 52 will now be described with reference to FIGS. 3, 4 and 5. As previously indicated, the frame 140 of the angular transport assembly 50 is pivotally mounted on the carriage block 102 of the vertical transport assembly 48. The frame 140 has a bore 170 defined therein located to receive a mounting shaft or pin 172 extending from the carriage block 102. The bore 170 has a bushing 174 and bearings 176 mounted thereabout to permit the frame 140 (and welding head 42) to be rotated approximately 90° degrees about the mounting pin 172. Accordingly, the welding head 42 may be moved from an operational position (shown on FIG. 4) to a retracted, non-operational position (shown on FIG. 5). In the operational position, the welding head 42 is disposed generally perpendicular to the first pipe section 22 to effect the welding process along the weld seam 26. In the operational position, the welding head 42 is directed away from the first pipe section 22 in a direction roughly parallel to the weld seam 26. While in this position, the welding head 42 may be readily accessible for the purpose of cleaning, servicing or inspection. A clamp 182 mounted to the frame 140 and the carriage block 102 is manually operable to lock the welding head 42 in the operational or retracted positions.

To actuate the retracting mechanism 52, the clamp 182 is first released. The frame 140 is then urged to rotate about the mounting pin 172, thereby causing the welding head 42 to be moved from the operating position to the retracted position. The clamp 182 is then engaged to secure the welding head 42 in the retracted position while cleaning or servicing activities are being carried out. Upon completion of these activities, the clamp 182 is released to permit the welding head 42 to be returned to the operational position. When returned to the operational position, the welding head 42 is in the precise position it occupied prior to retraction. Actuation of the retracting mechanism 52 does not alter the pre-adjusted contact-to-work offset of the tip of the welding head 42 relative to the weld seam 26. Accordingly, no further positional adjustment of the welding head 42 is necessary to allow the welding operation to resume as before.

The welding head 30 is now described in greater detail. The welding head 30 comprises a torch 190 for applying consumable weld metal and heat to the weld seam 26. In accordance with the GMAW process, the torch 190 uses welding wire as a consumable electrode to form an arc between the power source and the weld seam 26. As the weld bead forms, the wire contributes molten metal to the weld puddle. Alternatively, the torch 190 could be designed to perform the Flux Core Arc Welding process (FCAW) or the Peak Arc Welding process (PAW).

In the GMAW process, welding wire is constantly driven through the torch 190 by a motorized wire feed device (not shown) supplied by wire spools. The wire spools (not shown) are not mounted to the main carriage 28 and as a result, the use of small and very costly welding wire spools is avoided. Larger off-the-shelf wire spools may be used instead, leading to reduced welding wire costs. Moreover, since the wire spools are not carried on the main carriage 28, the weight of the pipe welding apparatus 20 may be considerably lighter than conventional welding apparatus. If desired, current sensor (not shown) may be employed for detecting welding amperage in order to ensure that the wire feed device delivers sufficient wire to maintain the proper wire stick.

As previously indicated, the horizontal, and the angular transport assemblies 46 and 50, respectively, may be actuated individually or in combination one with the other to encourage appropriate distribution of the consumable electrode over the weld seam 26.

Figure 7:
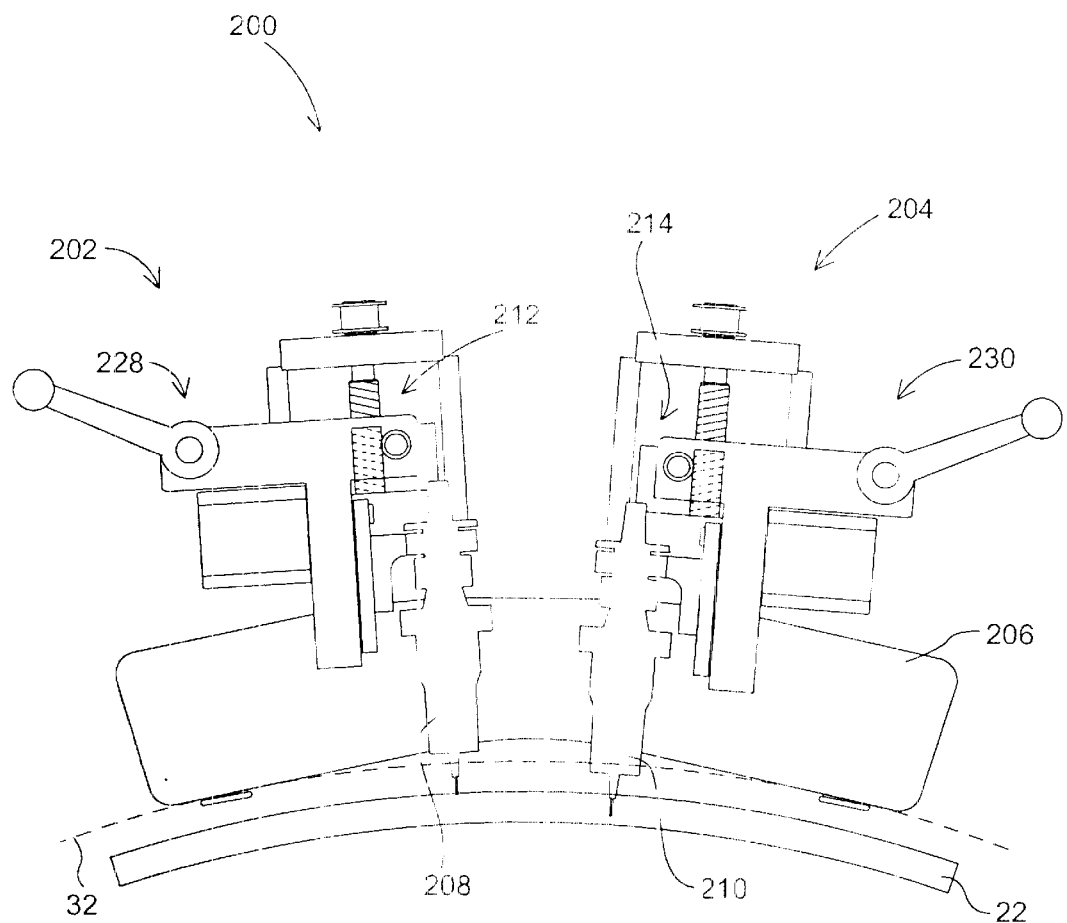
FIG. 7 is an elevational view of a pipe welding apparatus according to a second embodiment of the invention, showing dual welding assemblies supported on a main welding carriage, a first welding head in an operational position and a second welding head in an operational position.
Figure 8:
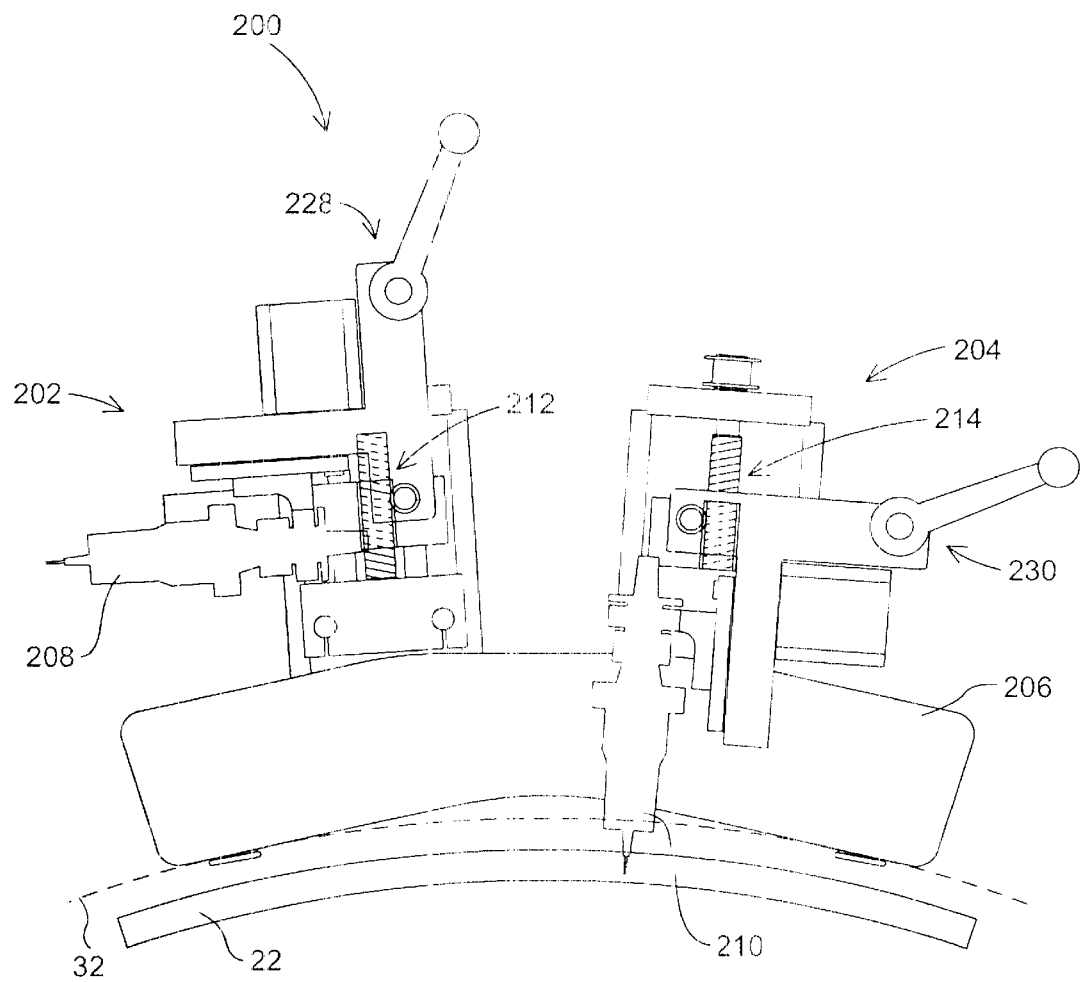
FIG. 8 is a view of the pipe welding apparatus, similar to that shown in FIG. 7, showing the first welding head in a retracted, non-operational position and the second welding head in the operational position.
Figure 9:
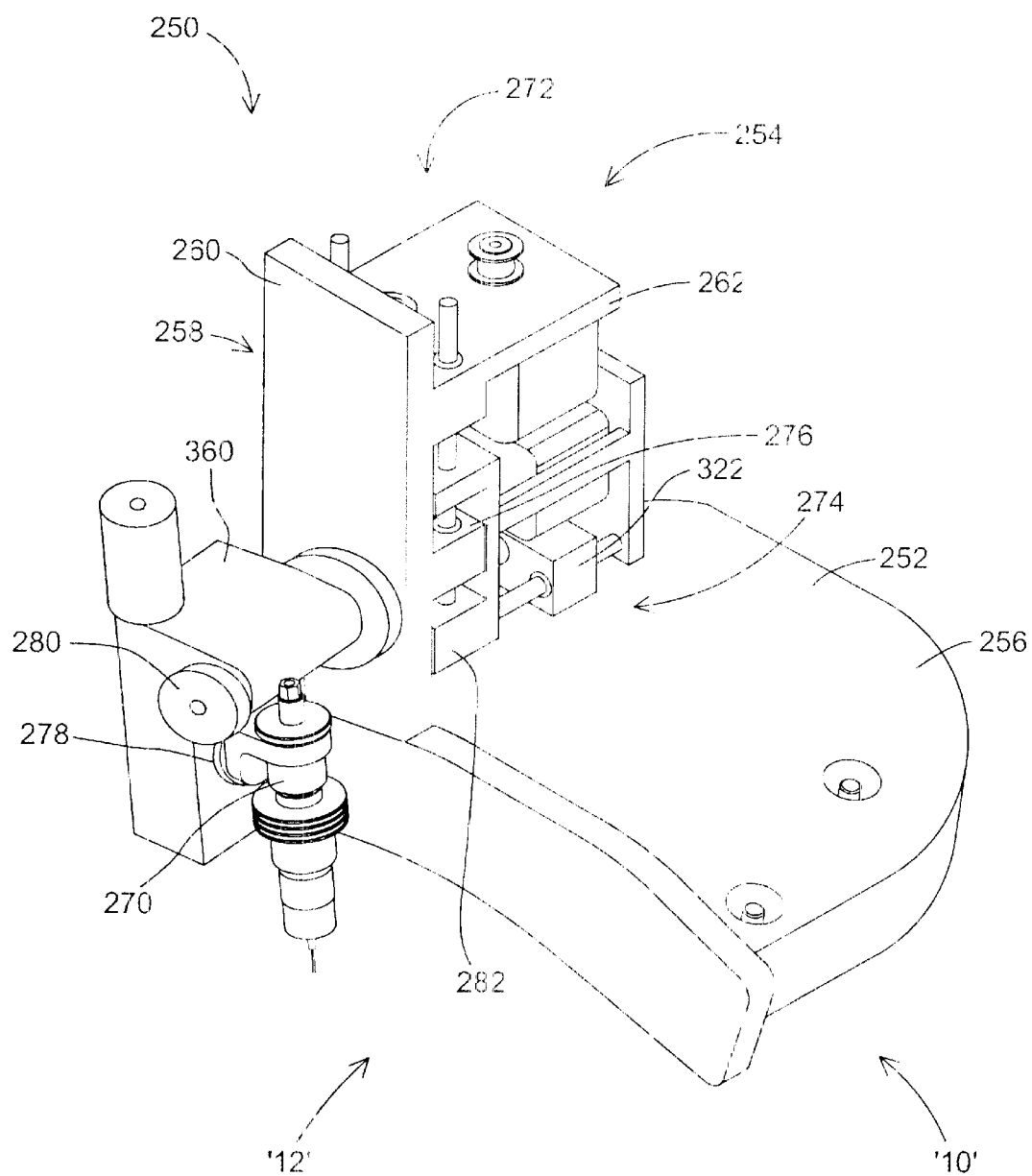
FIG. 9 is a perspective view of a pipe welding apparatus according to a third embodiment of the invention, showing a single welding assembly supported on a main welding carriage.

Although, in the first embodiment, only a single welding assembly 30 is carried on the main carriage 28 of the pipe welding apparatus 20, the welding assembly 30 is sufficiently compact and self contained that multiple welding assemblies may be carried on the main carriage 28. FIGS. 7 and 8 show a second embodiment of the invention in which a pipe welding apparatus, generally indicated as 200, has a first welding assembly 202 and a second welding assembly 204 supported on a main carriage 206. The main carriage 206 is similar in construction and operation to main carriage 28. Attachment of each welding assembly 202, 204 to main carriage 206 is achieved in a manner similar to that of welding assembly 30 to main carriage 28.

Each welding assembly 202, 204 is similar in construction and operation to the welding assembly 30. Each welding assembly 202, 204 has a welding head 208, 210 and an electronically controlled mechanism 212, 214 for controlling the movement of welding head 208, 210 relative to weld seam 26. Mechanisms 212 and 214 are similar to the multi-axis mechanism 44. Each welding assembly 202, 204 also has a manually-operated retracting mechanism 228, 230 for pivoting the welding head 208, 210 away from the weld seam 26.

The welding assembly 202 is disposed on the main carriage 206 opposite the welding assembly 204 in such a fashion that one is the mirror image of the other. This arrangement permits the rotational retraction of one welding head without physically interfering with the other (see FIG. 8). When the retracting mechanism 228 is actuated, the welding head 208 of the first welding assembly 202 will be rotated in a clockwise direction from an operational position (shown on FIG. 7) to a retracted, non-operational position (shown on FIG. 8). When the retracting mechanism 230 is actuated, the welding head 210 of the second welding assembly 204 will be subject to counterclockwise rotation from an operational position to a retracted, non-operational position (not shown). In this way, the welding heads 208 and 210 may be rotated away from the first pipe wall 22 and each other for rapid and easy servicing.

Each welding assembly 202, 204 operates independently of the other, except in regard to the overall travel speed of the main carriage 206. This particular welding parameter is necessarily common to both welding assemblies 202 and 204. The operational independence of welding assemblies 202 and 204 provides a high level of versatility that may be highly beneficial in the field use of automated welding procedures. Different oscillation schemes may be generated for each welding head 208, 210. In addition, the contact-to-work offsets of each welding head 208, 210 may be varied for added versatility, as shown in FIG. 7, thereby allowing the two weld processes to take place at different elevations.

In the first and second embodiments, the multi-axis drive mechanisms 44 and 212 and 214, respectively, are constructed such that the carriage of the horizontal transport assembly provides a platform for supporting the vertical and angular transport assemblies. However, alternative arrangements of the transport assemblies are possible. For instance, the hierarchy of horizontal and vertical transport assemblies can be reversed such that the horizontal and angular transport assemblies may be carried on the carriage of the vertical transport assembly. FIGS. 9 through 15 show a third embodiment in which a pipe welding apparatus, generally indicated as 250, comprises a motor-driven, main welding carriage 252 and a welding assembly 254 carried thereon. The pipe welding apparatus 250 is installed in generally the same manner about the first pipe 22 as the pipe welding apparatus 20.

The main carriage 252 has a generally arcuately shaped base 256 similar to the base 34 of pipe welding assembly 20. A frame 258 (seen best in FIG. 10) is mounted to the base 256 for supporting the welding assembly 254. The frame 258 is comprised of a vertical wall portion 260 extending in a generally perpendicular direction away from the base 256 and a horizontal support plate 262 integrally formed with and extending transversely of the vertical wall portion 260. The welding assembly 254 is carried by the frame 258.

The welding assembly 254 comprises a welding head 270 similar in construction and operation to the welding head 42 of the pipe welding apparatus 20, and an electronically controlled, multi-axis drive mechanism 272 for moving the welding head 270 relative to the weld seam 26. The multi-axis drive mechanism 272 comprises:

(a) a horizontal transport assembly 274 for linearly translating the welding head 270 in a direction transverse of the weld seam 26;

(b) a vertical transport assembly 276 for displacing the welding head 270 perpendicular to the first pipe section 22 so as to adjust the proximity of the welding head 270 to the weld seam 26; and (c) an angular transport assembly 278 for pivotally oscillating the welding head 270, in a pendulum style motion, transverse of the weld seam 26.

The welding assembly 254 also has a manually-operated retracting mechanism 280 for pivoting the welding head 270 away from the weld seam 26. Each of these mechanisms will now be described in greater detail.

Figure 10:
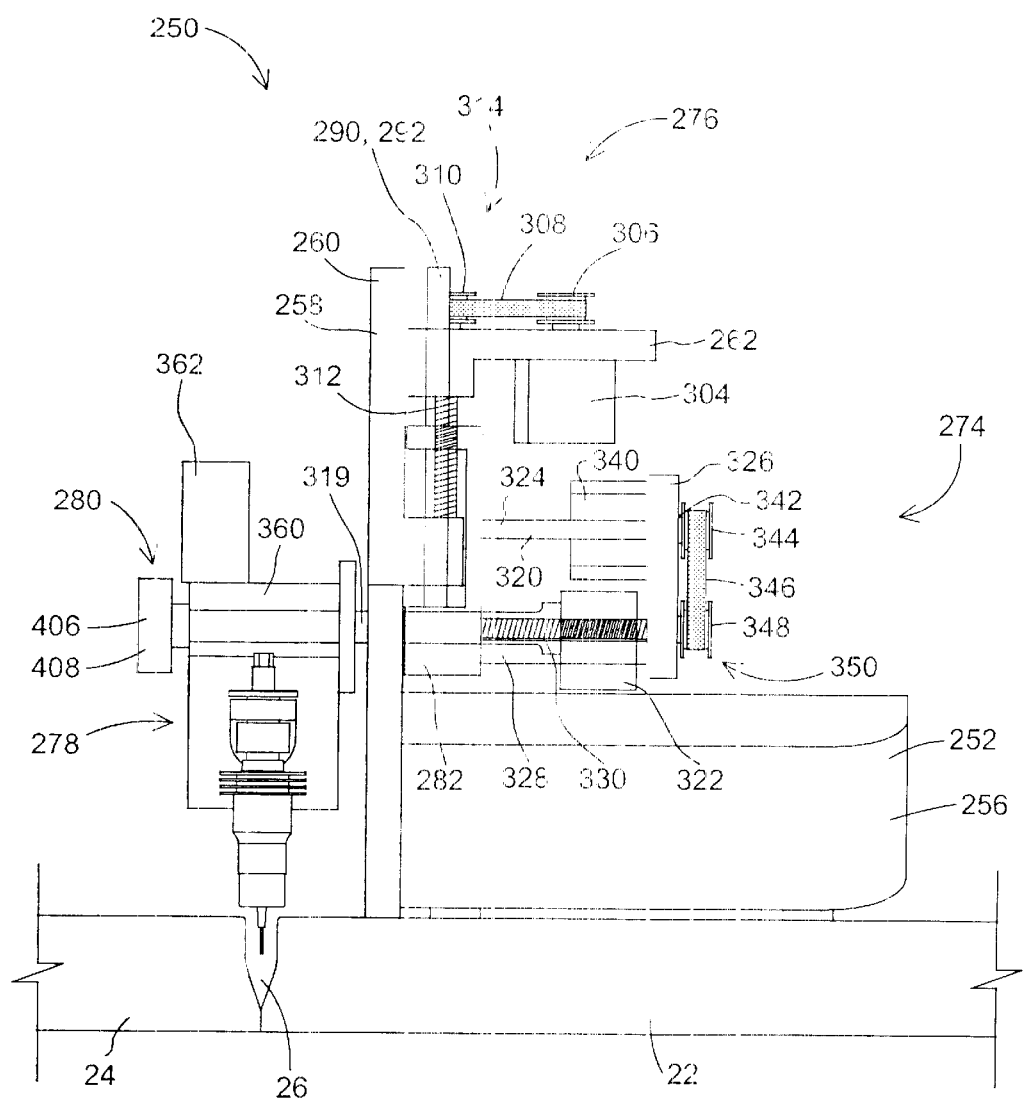
FIG. 10 is an elevational view of the pipe welding apparatus of FIG. 9 taken in the direction of arrow "10", showing a typical installation of the pipe welding apparatus on a first pipe section.
Figure 11:
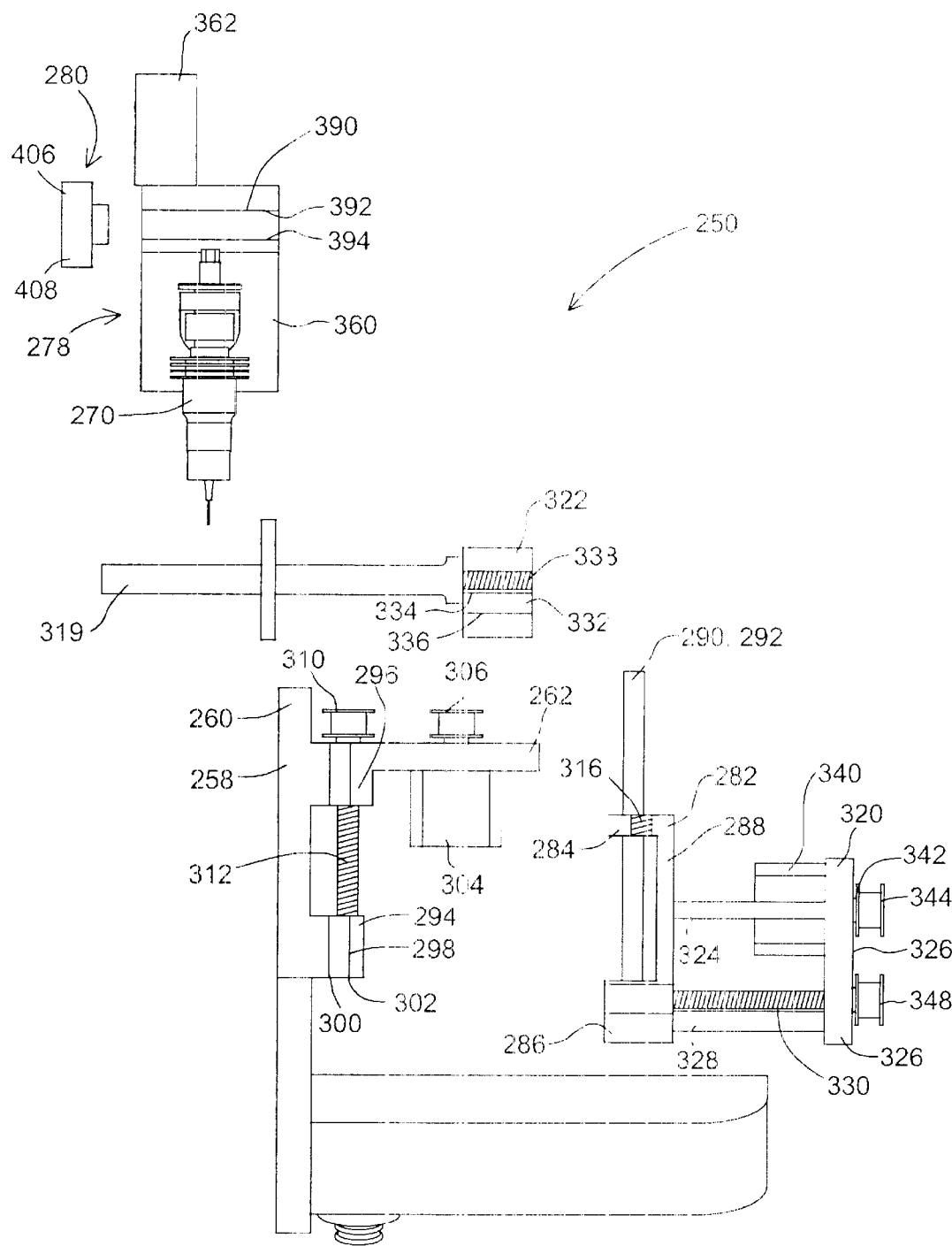
FIG. 11 is a partially exploded view of the pipe welding apparatus, similar to that shown in FIG. 9.
Figure 14:
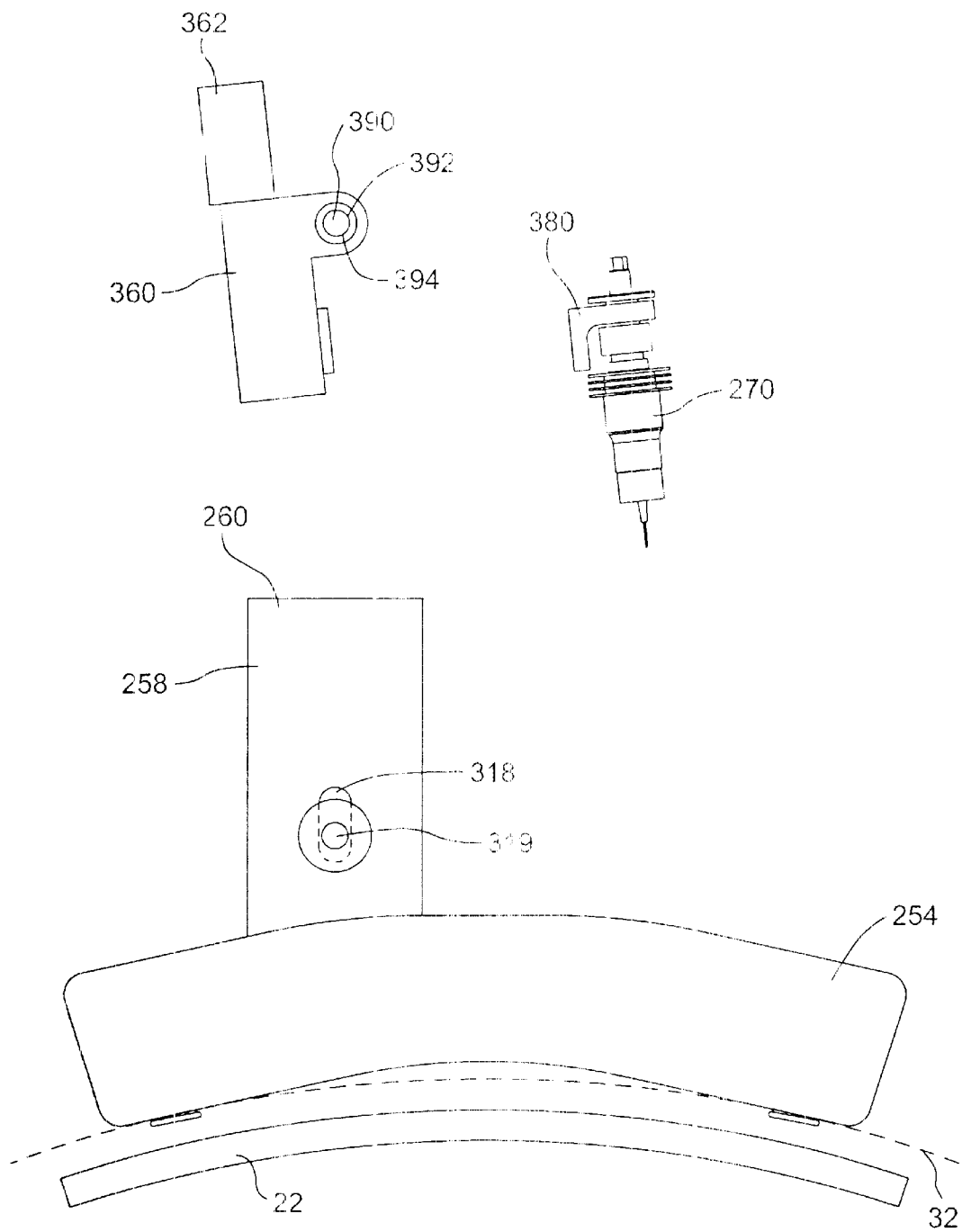
FIG. 14 is a partially exploded view of the pipe welding apparatus, similar to that shown in FIG. 12.

Referring particularly to FIGS. 10, 11 and 14, the vertical transport assembly 276 has a motor-driven carriage 282 which imparts vertical motion to the welding head 270 relative to the first pipe section 22. The carriage 282 has a pair of opposed mounting blocks 284 and 286 which support a vertical plate 288 extending therebetween. The mounting blocks 284 and 286 fixedly retain a pair of cylindrical guide members or rods 290 and 292 that are disposed generally parallel to the vertical plate 288. However, the guide rods 290 and 292 are slidably mounted to a pair of mounting blocks 294 and 296 that are integrally formed with frame 258 thereby securing the vertical transport assembly 276 to the main carriage 252. Each mounting block 294, 296 has a pair of bores generally indicated as 298 defined therein located to receive the guide rods 290 and 292 therethrough. Each bore 298 has a bushing 300 and bearings 302 mounted thereabout to permit the guide rod 290 or 292, as the case may be, to slide within the mounting blocks 294 and 296 when the vertical transport assembly 276 is actuated.

An electronically controlled motor 304 mounted to the horizontal support plate 262 drives the carriage 282 relative to the main carriage 252. The motor 304 has an output shaft onto which a cog 306 is mounted. The cog 306 has projections (not shown) such as ribs which engage corresponding projections (not shown) on the underside of a band or belt 308. The belt 308 is connected to a second cog 310 which is mounted to a threaded shaft 312 that is fitted through the horizontal support plate 262. The belt 308, the second cog 310 and the threaded shaft 312 co-operate to form a cog pulley 314 similar to cog pulley 130 of pipe welding apparatus 20. Through this arrangement, the threaded shaft 312 is precluded from translational movement relative to main carriage 252, but is permitted to rotate in place.

The mounting block 284 has a threaded bore 316 that is adapted to receive and threadingly engage the shaft 312. The guide rods 290 and 292 and the shaft 312 co-operate to translate the carriage 282 relative to the main carriage 252 in a direction that is perpendicular to first pipe section 22.

Actuating the motor 304 causes the belt-driven shaft 312 to rotate. As the shaft 312 rotates, its threading engages the counterpart threading of the bore 316. Since the shaft 312 is constrained to only a rotational motion, the carriage 282 is urged to travel along the threaded shaft 312 and slide along the guide rods 290 and 292. The welding head 270 is thus urged to move in a direction generally perpendicular to first pipe section 22. The extent to which the welding head 270 may be displaced vertically depends on the size of an aperture or slot 318 (as best shown in FIG. 14) defined within vertical wall portion 260. As will be explained below in greater detail, a mounting rod, pin or shaft 319 is mounted to extend through slot 318 to connect the horizontal transport assembly 274 to the angular transport assembly 278. As a result, the slot 318 constrains the vertical displacement of welding head 270 to a pre-selected range.

Referring particularly to FIGS. 10 and 11, the horizontal transport assembly 274 is supported on the carriage 282 of the vertical transport assembly 276. The assembly 274 comprises a structural frame 320 and a motor-driven carriage block 322 which is movable relative to the main carriage 252 in a direction that is generally transverse of the weld seam 26. The structural frame 320 comprises a horizontal plate 324 which is mounted to vertical plate 288 of carriage 282 and a vertical plate 326 connected to the horizontal plate 324. A cylindrical guide member or rod 328 and a threaded shaft 330 are mounted so as to extend between vertical plates 288 and 326.

The carriage block 322 has a first bore 332 defined therein located to receive guide rod 328 therethrough. The bore 332 has a bushing 334 and bearings 336 mounted thereabout to permit the carriage block 322 to slide along the guide rod 328 when the horizontal transport assembly 274 is actuated. The carriage block 322 also has a second threaded bore 338 that is adapted to receive and threadingly engage the shaft 330. As will be explained in greater detail below, the guide rod 328 and the shaft 330 co-operate to translate the carriage block 322 relative to the main carriage 252 in a direction that is generally transverse of the weld seam 26.

An electronically-controlled motor 340 is secured to the structural frame 320. The motor 340 has an output shaft 342 which extends through the vertical plate 326 and is connected to a cog 344. Projections (not shown) such as ribs on the cog 344 engage corresponding projections (not shown) on the underside of a band or belt 346 which is connected to a second cog 348 that, in turn, is mounted to the threaded shaft 330. Belt 346, second cog 348 and threaded shaft 330 co-operate to form a cog pulley 350 similar to the cog pulley 88 of pipe welding apparatus 20. Through this arrangement, the threaded shaft 330 is precluded from translational movement relative to the main carriage 252 but is permitted rotational motion.

Actuating the motor 340 causes the belt-driven threaded shaft 330 to rotate. As the shaft 330 rotates, its threading engages the counterpart threading of second bore 338. Since the threaded shaft 330 is constrained to only a rotational motion, the carriage block 322 is urged to travel along the threaded shaft 330 and slide along the guide rod 328. The welding head 270 is thus urged to move in a direction transverse of the weld seam 26.

Figure 15:
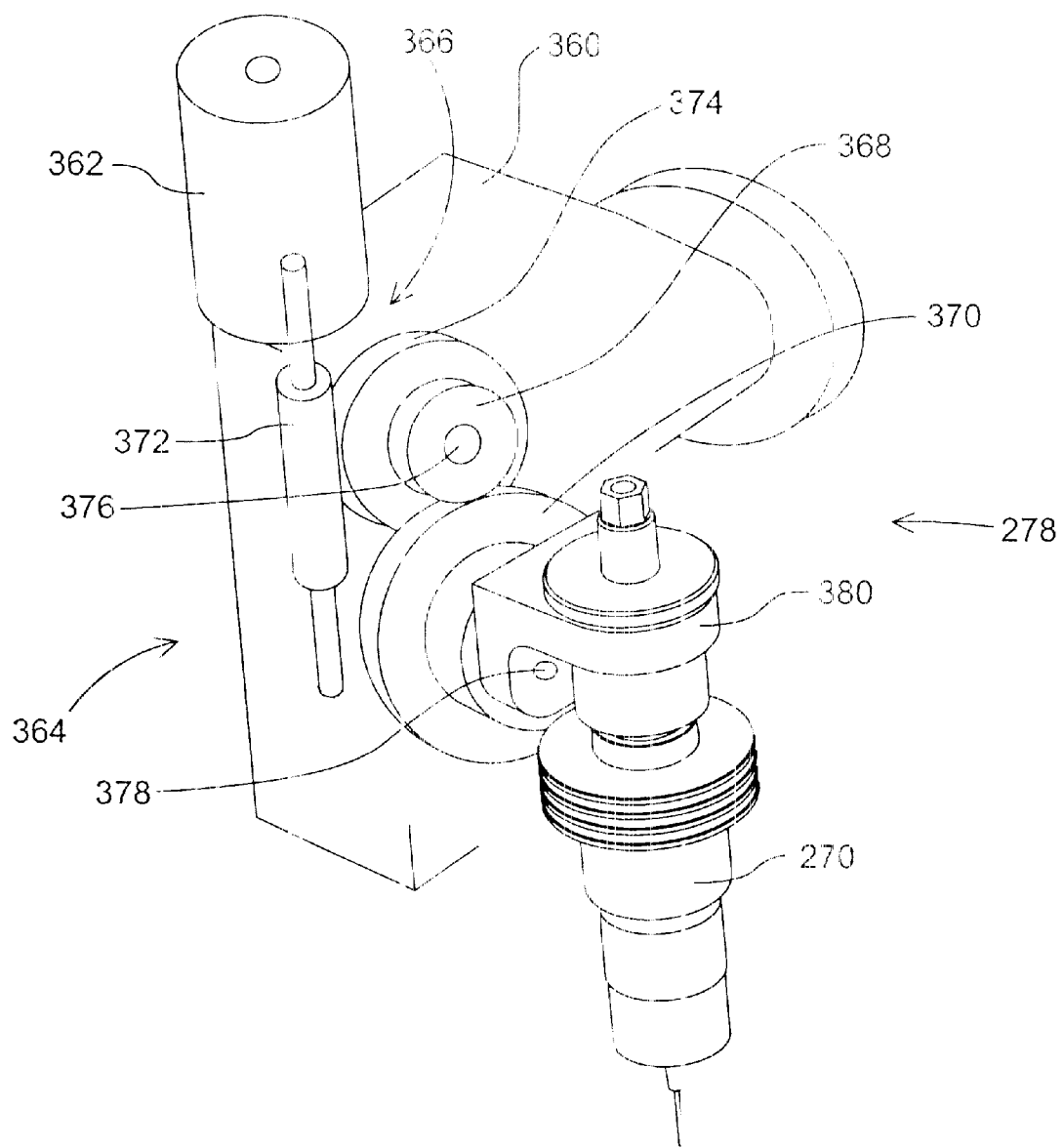
FIG. 15 is an enlarged perspective view of the welding head of the third embodiment taken in isolation (wherein the head is mounted on a frame, a portion of the frame having been removed to show a gear train housed therewithin for pivotally oscillating the welding head)

Referring particularly to FIGS. 10, 11 and 15, the angular transport assembly 278 comprises a frame 360 which is pivotally mounted to the carriage block 322 of the horizontal transport assembly 274. An electronically-controlled motor 362 is mounted to the frame 360 to drive a gear train 364 housed within the frame 360. The gear train 364 comprises a first worm gear 366, a second gear, such as a pinion spur gear 368 and a third gear, such as a crown spur gear 370. The worm gear 366 has a vertical worm 372 driven by the motor 362 which works upon a toothed wheel 374. The toothed wheel 374 is mounted on a first horizontal shaft 376 which is pivotally mounted to the frame 360. The toothed wheel 374 is coupled to the pinion spur gear 368 such that rotation of the wheel 374 causes a corresponding rotation of the gear 368. The crown spur gear 370 is mounted to a second horizontal shaft 378 and disposed within the gear train 364 for engagement by pinion spur gear 368. A mount or bracket 380 is securely fixed to the second horizontal shaft 378 and carries the welding head 270.

As will be understood from the foregoing, the motor 362 drives the worm gear 366 causing the pinion spur gear 368 to rotate about the first horizontal shaft 376. This rotational motion is transferred to the crown spur gear 370 and the second horizontal shaft 378 is urged to rotate. Since the welding head 270 is fixedly secured to the shaft 278, as the shaft 278 rotates the welding head 270 is pivoted transversely of the weld seam 26. Pivotal oscillation of the welding head 270 is achieved by alternating the driving direction of the motor (i.e. clockwise to counter-clockwise). In this manner, a direct drive system is provided, however, those skilled in the art will understand that other gear train configurations are possible and may be employed to generate the pivotal oscillation.

As with the angular transport assembly 50 of the pipe welding apparatus 20, the rate, magnitude and velocity profile parameters of the oscillatory motion of the welding head 270 may be adjusted electronically. Similarly, the angular transport assembly 278 may also have oscillation dwell capabilities. Likewise, during a typical operation of the pipe welding apparatus 250, the horizontal and angular transport assemblies 274 and 278, respectively, may be actuated individually, sequentially, or simultaneously, i.e., in combination one with the other.

Figure 12:
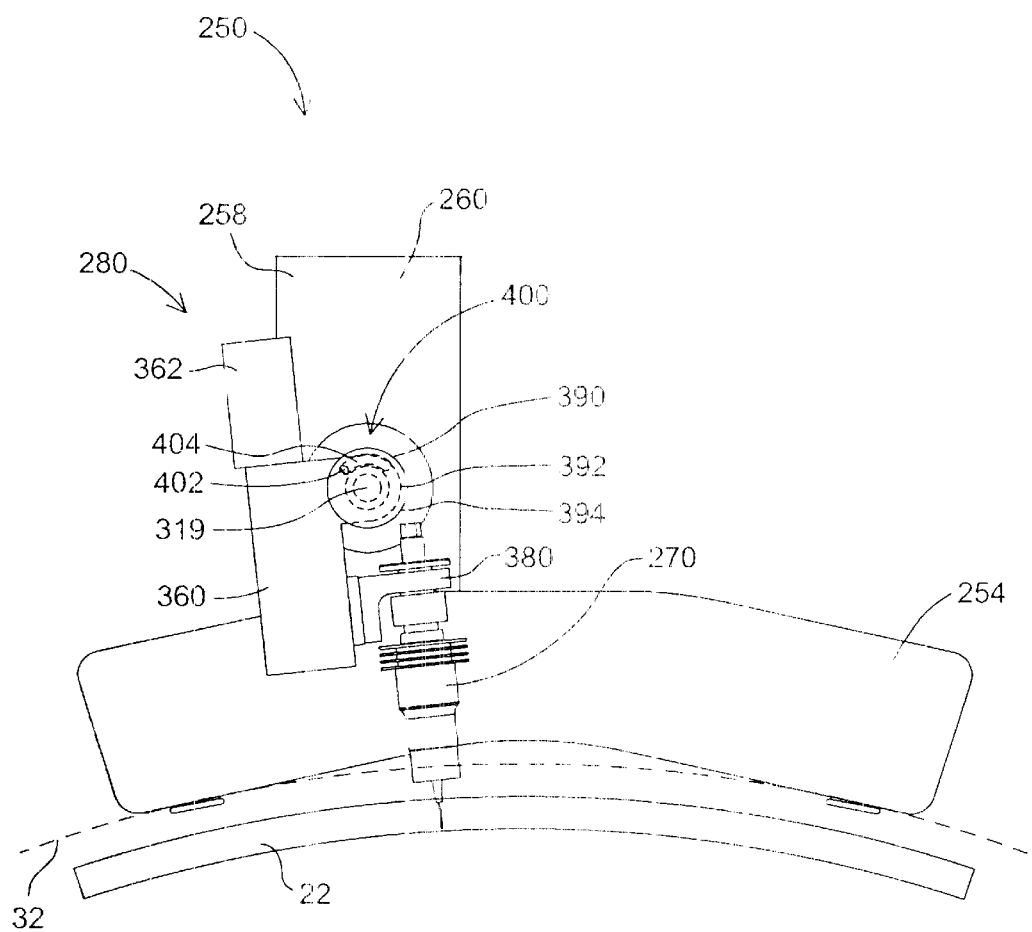
FIG. 12 is an elevational view of the pipe welding apparatus of FIG. 9 taken in the direction of arrow "12", showing a welding head in an operational position.
Figure 13:
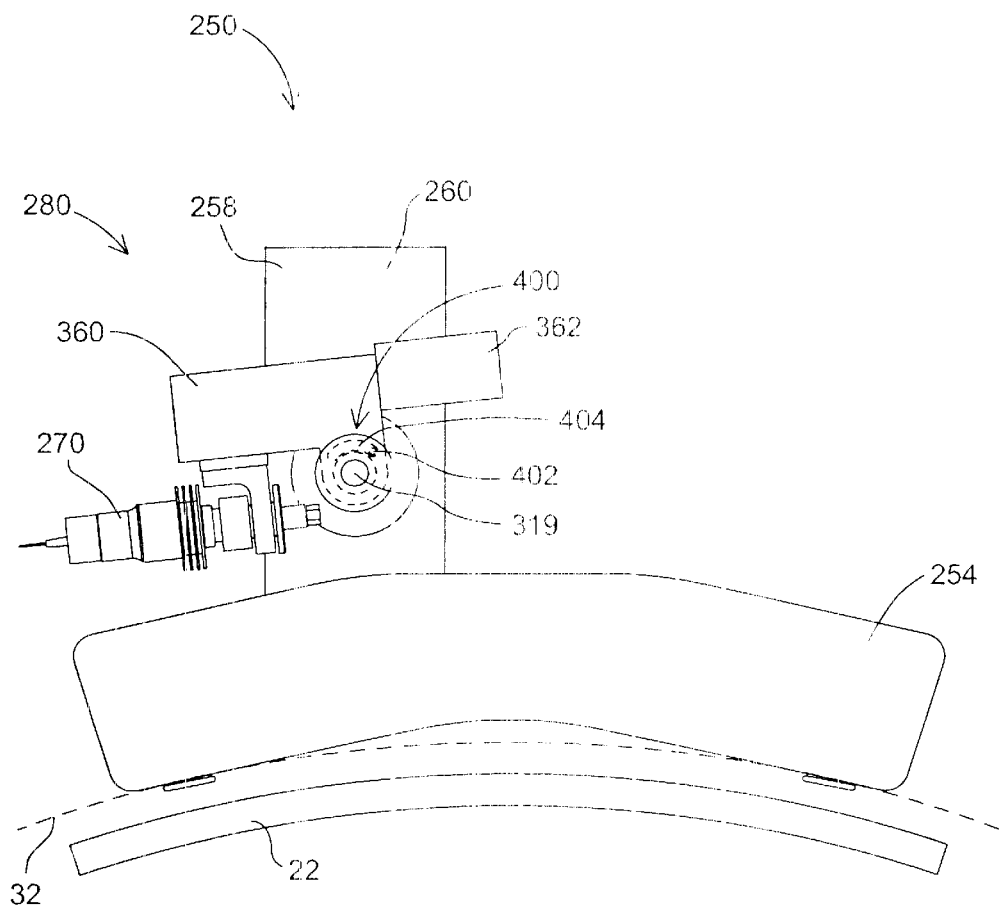

The retracting mechanism 280 will now be described with reference to FIGS. 11, 12 and 13. As previously mentioned, the frame 360 of the angular transport assembly 278 is pivotally mounted to the carriage block 322 of the horizontal transport assembly 274. The mounting shaft 319 extends from the carriage block 322 through the slot 318 of the vertical wall portion 260 and is received within a bore 390 defined in the frame 360. The bore 390 has a bushing 392 and bearings 394 mounted thereabout to permit the frame 360 (and welding head 270) to be rotated approximately 90° degrees in a clockwise direction about the mounting shaft 319. Accordingly, the welding head 270 may be moved from an operational position (shown on FIG. 12) to a retracted, non-operational position (shown on FIG. 13). Rotation of the welding head 270 about the mounting shaft 319 is constrained by a pin and slot arrangement 400. Arrangement 400 has a pin 402 connected to mounting shaft 319 which is mounted to travel within an arcuate slot 404 defined within the frame 360.

In the first position 396, the welding head 270 is disposed generally perpendicular to the first pipe section 22 to effect the welding process along the weld seam 26. In the retracted position, the welding head 270 is directed away from the first pipe section 22 in a direction roughly parallel to the weld seam 26. While in this position, the welding head 270 may be readily accessible for the purpose of cleaning, servicing or inspection. A clamp 406 having a threaded cap 408, and mounted to the frame 360 and the vertical wall member 260, is manually operable to lock the welding head 270 in the operational positions.

To actuate the retracting mechanism 280, the clamp 406 is first released by unscrewing the cap 408. The frame 360 is then urged into a clockwise rotation about the mounting shaft 319, thereby causing the welding head 270 to be moved from the first position 396 to the second position 398. The cap 408 is then tightly screwed to secure the welding head 270 in the second position 398 while cleaning or servicing activities are being carried out. Upon completion of these activities, the clamp 406 is released to permit the welding head 270 to be returned to the first position 396.

Figure 16:
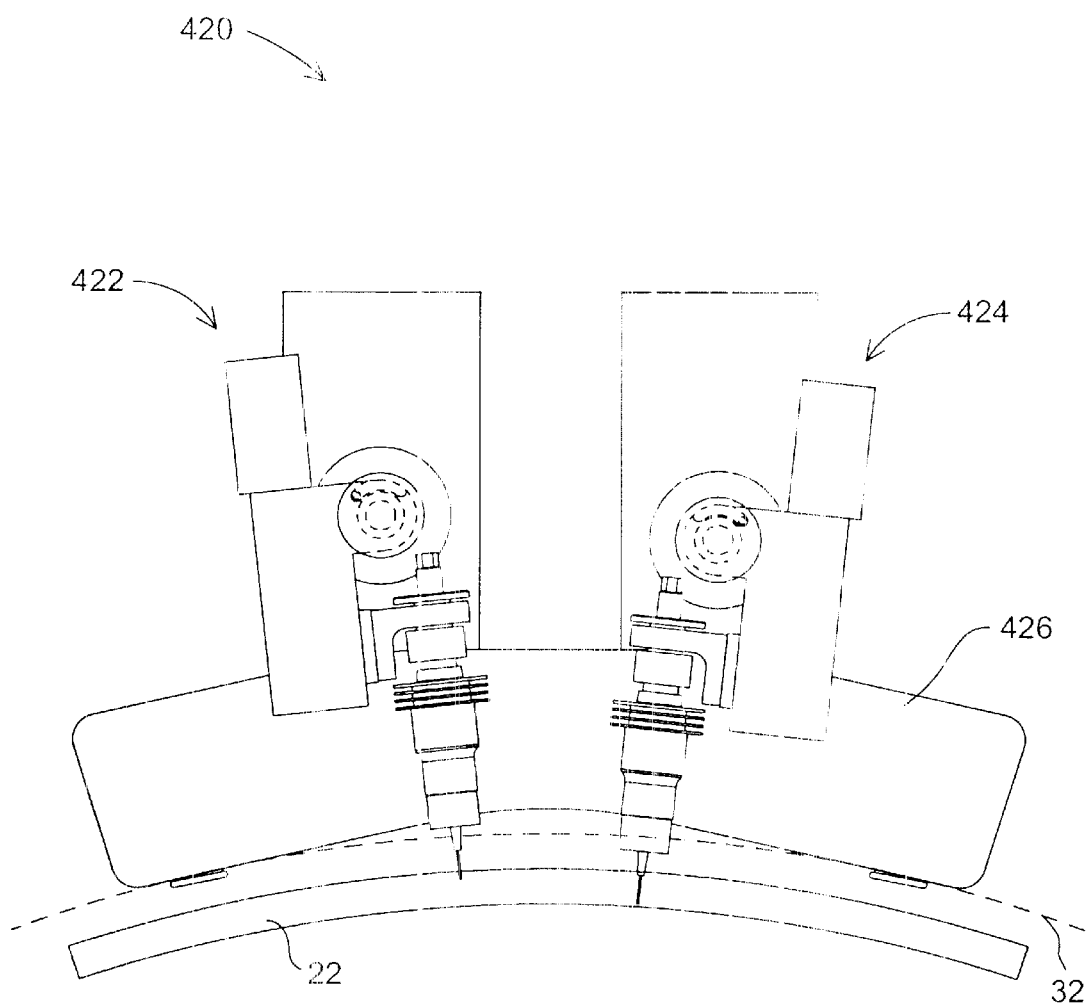
FIG. 16 is an elevational view of a pipe welding apparatus according to a fourth embodiment of the invention, showing dual welding assemblies supported on a main welding carriage.
Figure 17:
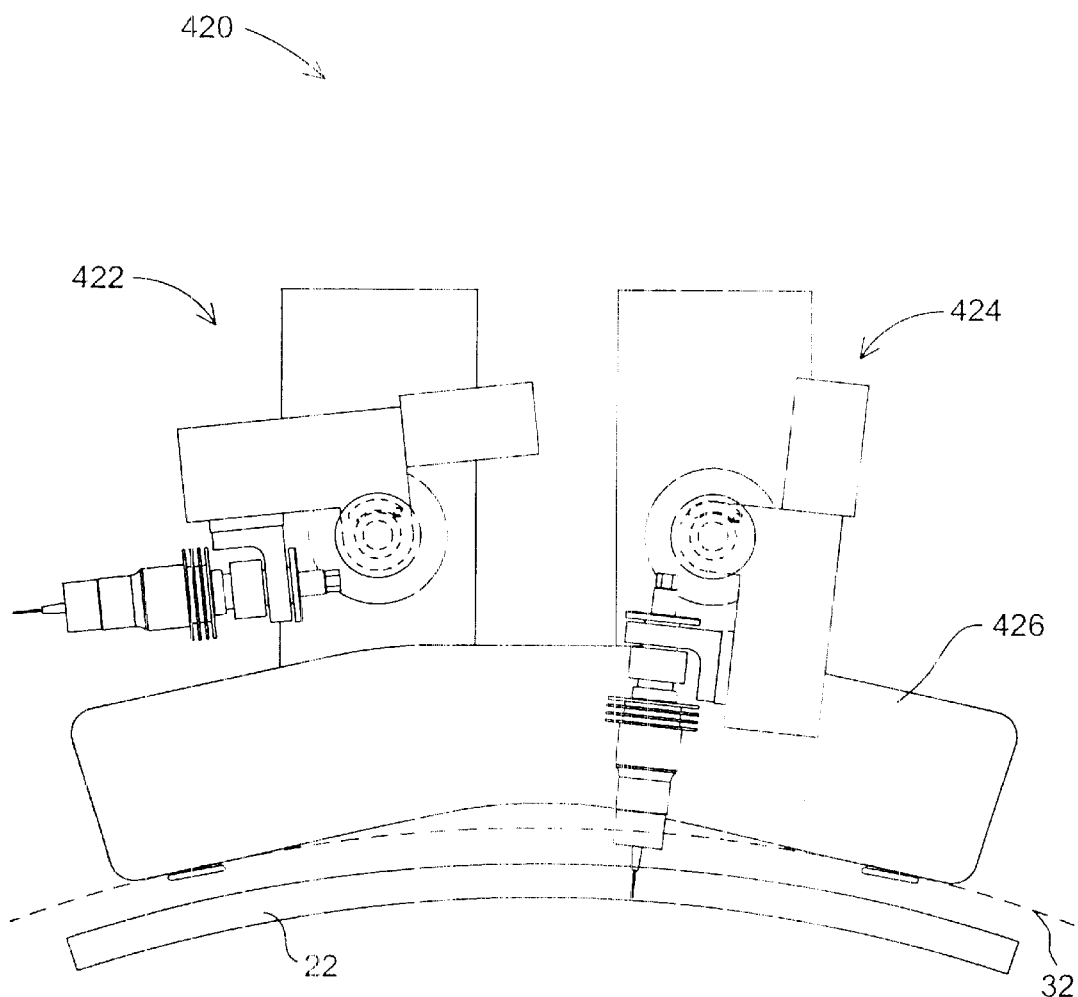
FIG. 17 is another view of the pipe welding apparatus, similar to that shown in FIG. 16, showing the welding assemblies supported on a main welding carriage.

In like fashion to welding assembly 30 of pipe welding apparatus 20, welding assembly 254 is sufficiently compact and self contained such that multiple welding assemblies may be carried on the main carriage 252. FIGS. 16 and 17 show a fourth embodiment of the invention in which a pipe welding apparatus, generally indicated as 420, has a first welding assembly 422 and a second welding assembly 424 supported on a main carriage 426. The arrangement of assemblies 422 and 424 on the main carriage 426 is similar to that of assemblies 202 and 204 on the main carriage 206 of pipe welding apparatus 200. The construction and operation of welding assemblies 422 and 424 resemble that of welding assembly 254 of pipe welding apparatus 250.

Various pipe welding apparatus 20, 200, 250 and 420 have been described as having electronically-controlled transport mechanisms for moving the welding head relative to the weld seam 26.

Figure 18:
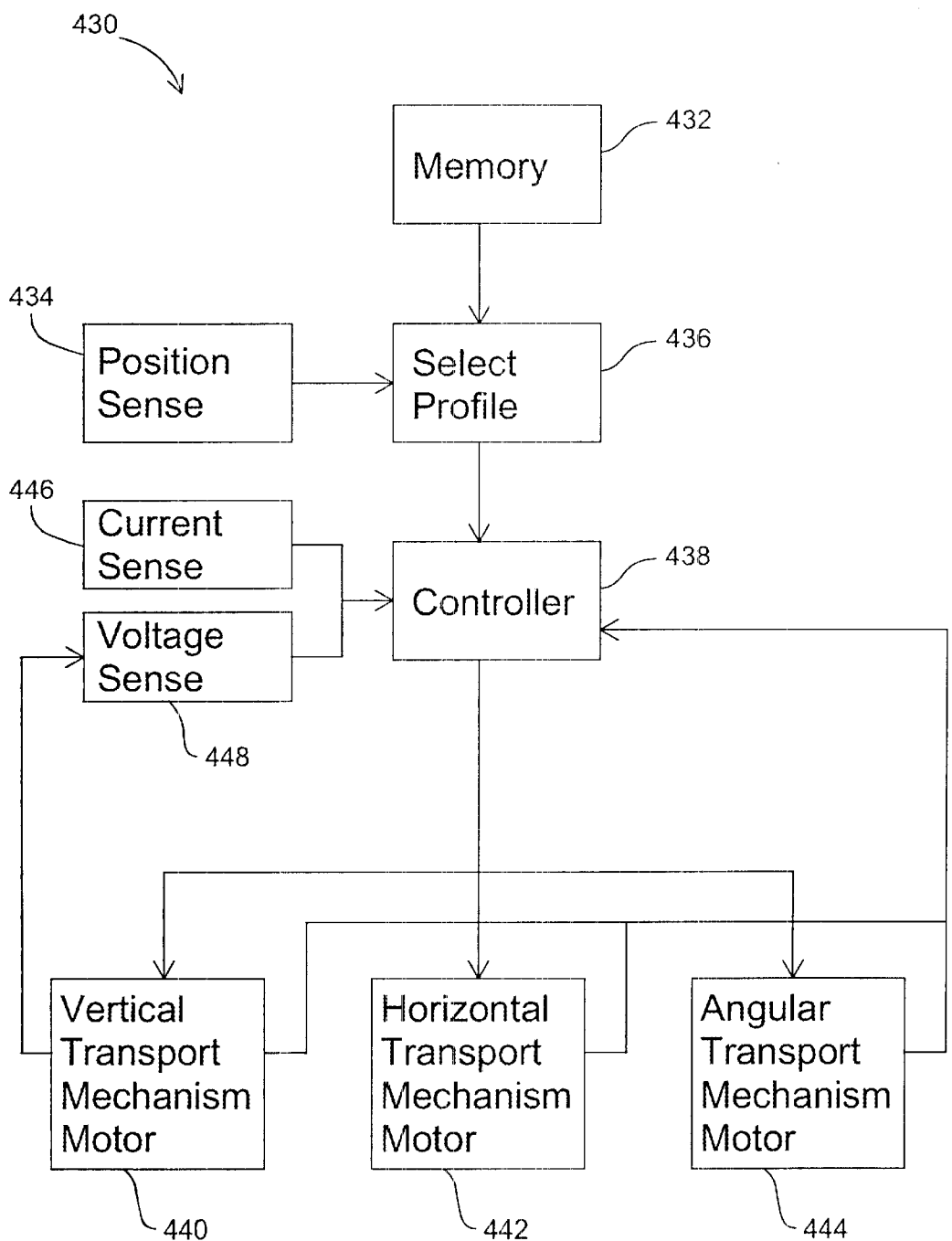
FIG. 18 is a system block diagram of a control system for controlling any of the aforementioned welding assemblies.

A preferred control system 430 is shown in block diagram form in FIG. 18. The system comprises a memory 432 in which a plurality of programmable profiles are stored. Each such profile describes a two dimensional or x-y trajectory for the tip of the welding torch, the frame of reference being situated such that the x axis represents a direction transverse to the weld seam and the y-axis represents a direction vertical to the weld seam. The trajectory also specifies the orientation or angle of the welding torch tip relative to the y-axis. If desired, a graphical user interface may be employed in conjunction with an external computer to describe and plot the foregoing three parameters over time, including oscillation characteristics such as dwell time, as will be known to those skilled in this art. The plotted data can thus be downloaded into the memory 432 via a communications link (not shown) to form a particular trajectory. In addition, each profile also includes welding parameters such as desired current, voltage, main carriage travel speed and wire feed speed.

A block 436 of the control system 430 selects a particular profile stored in the memory 432 in order to control the welding apparatus at any given point in time. The selected profile is preferably based on the circumferential position of welding apparatus about the pipe sections. For this reason the control system 430 includes a circumferential position sensing subsystem 434, as known in the art per se, which feeds circumferential position data to the selector block 436. In this manner weld profiles can be automatically selected for different circumferential passes of the welding apparatus, as well as for different angular sectors, as may be needed, for instance, to control "drip" of any molten weld metal due to the influence of gravity as the welding apparatus travels around the pipe sections. The selected trajectory and welding parameters are fed into a motor controller block 438 which controls the motors 440, 442 and 444 of the horizontal, vertical and angular transport mechanisms, respectively. The controller 438 preferably employs a closed loop based control law such as well known p.i., p.i.d, or state-space based error feedback loops. Based on one or more such loops the controller 438 provides commands to current amplifiers (not shown) which supply the desired currents to the motors 440, 442 and 444. Each motor 440, 442, 444 has a feedback sensor for determining its position. This information is fed back to the controller 438 in order to enable it to compute the absolute position and angle of the welding tip and thereby to control the motors 440, 442 and 444 so as to minimize any error between the desired and actual position.

Sensors 446 and 448 provide the controller 438 with feedback as to the actual or measured welding current (I) and welding voltage (V). The controller 438 uses this feedback to calculate the instantaneous heat input into the weld, which is measured as (V)(I)*/60(S), where S is the travel speed of the main carriage. In preferred embodiments the controller 438 employs an additional control loop to maintain the heat input to the desired amount by varying the vertical distance between the welding tip and the welding seam, thereby varying the welding current and welding voltage characteristics. This control loop overrides the control loop for the vertical component of the trajectory (i.e., the y-axis) and thus the vertical component or parameter of the trajectory stored in the memory 432 can be considered to be a nominal or baseline parameter only which will be varied in response to actual welding conditions. In this manner, the control system 430 ensures that minimum heat input is supplied to the weldment in accordance with specifications.

It will be understood by those skilled in the art that the foregoing description is made with reference to illustrative embodiments of the invention and that other embodiments employing the principles of the invention may be envisaged.

We claim:

1. An apparatus for welding abutting pipe sections along a weld seam, said apparatus comprising:
    a motorized main carriage for travelling circumferentially about one of the pipe sections to be welded;
    a welding torch connected to the main carriage, the welding torch being movable relative to the main carriage;
    a first motorized transport mechanism connected to the main carriage for vertically displacing the welding torch relative to the weld seam;
    a second motorized transport mechanism connected to the main carriage for pivotally moving the welding torch transversely of the weld seam; and
    a controller for actuating the second transport mechanism so as to pivotally oscillate the welding torch transverse of the weld seam, wherein
    the controller actuates the first and the second transport mechanisms simultaneously so as to change a vertical position of a pivoting point of the torch in accordance with a pre-determined trajectory; and wherein
    the controller receives feedback as to a welding current, a welding voltage and actuating the first transport mechanism so as to effect a predetermined minimum heat input into the weld seam.

2. The apparatus of claim 1, wherein the controller prioritizes the function of effecting said pre-determined minimum heat input over the function of following said pre-determined trajectory for the pivoting point of the torch.

3. The apparatus of claim 1 further comprising a third motorized transport mechanism connected to the main carriage for linearly translating the welding torch transversely of the weld seam.

4. The apparatus of claim 3 including a controller for activating the third transport mechanism so as to linearly oscillate the welding torch transverse of the weld seam.

5. The apparatus of claim 4 wherein the controller is operable to actuate the first, the second and the third transport mechanisms simultaneously in order to effect a predetermined trajectory and angular orientation of the torch relative to one of the vertical or transverse directions.

6. The apparatus of claim 1 further comprising a retracting mechanism for rotating the welding torch away from the weld seam; the retracting mechanism including a clamp for securing the welding torch in position.

7. An apparatus for welding abutting pipe sections alone a weld seam, said apparatus comprising:
    a motorized main carriage for travelling circumferentially about one of the pipe sections to be welded;
    a welding torch connected to the main carriage, the torch being movable relative to the main carriage;
    a first motorized transport mechanism connected to the main carriage for linearly translating the torch transversely of the weld seam;
    a second motorized transport mechanism connected to the main carriage for pivotally moving the torch transversely of the weld seam; and
    a controller for actuating the second transport mechanism so as to oscillate the torch about a pivot point, transverse of the weld seam, and for actuating the first transport mechanism so as to linearly translate the pivot point transverse of the weld seam; wherein
    the first transport mechanism comprises
        a carriage connected to the welding torch,
        a motor for providing a driving force to effect linear translation of the welding torch;
        driving means interconnecting the motor and the carriage; and
        a frame for supporting the motor, the frame being fixed to the main carriage;
    the carriage being slidably mounted to the frame and translatable relative to the main carriage in a direction transverse of the weld seam;
    the carriage having guide means fixed thereto, the guide means being slidably mounted to the frame; and wherein
    the driving means comprises:
        a cog rotatably mounted to the motor for transmitting the driving force of the motor;
        a cog pulley rotatably connected to the cog and mounted to extend through the frame, the cog pulley including a threaded shaft rotatable about the frame; and
        a nut fixed to the carriage for threadingly engaging the shaft;
    the cog pulley being adapted to receive the driving force of the motor and to rotate the shaft, the nut being adapted to travel along the shaft when the motor is actuated to thereby urge the carriage to translate transversely of the weld seam.

8. An apparatus for welding abutting pipe sections along a weld seam, said apparatus comprising:
  a motorized main carriage for travelling circumferentially about one of the pipe sections to be welded;
  a welding torch connected to the main carriage, the torch being movable relative to the main carriage;
  a first motorized transport mechanism connected to the main carriage for linearly translating the torch transversely of the weld seam;
  a second motorized transport mechanism connected to the main carriage for pivotally moving the torch transversely of the weld seam; wherein
    the second transport mechanism comprises:
      a frame connected to the main carriage;
      a mount for carrying the welding torch;
      a motor for providing a driving force to effect pivotal motion of the welding torch, the motor being fixed to the frame;
      an eccentric cam connected to the motor; and
      a cam follower disposed intermediate the cam and the mount and pivotally attached to the frame, the cam follower being adapted to receive the driving force from the motor such that when the motor is actuated the cam follower is urged to rotate about the frame thereby causing the welding torch to move pivotally in a direction transverse of the weld seam.

9. An apparatus for welding abutting pipe sections along a weld seam, said apparatus comprising:
  a motorized main carriage for travelling circumferentially about one of the pipe sections to be welded;
  a welding torch connected to the main carriage, the torch being movable relative to the main carriage;
  a first motorized transport mechanism connected to the main carriage for linearly translating the torch transversely of the weld seam;
  a second motorized transport mechanism connected to the main carriage for pivotally moving the torch transversely of the weld seam;
  a controller for actuating the second transport mechanism so as to oscillate the torch about a pivot point, transverse of the weld seam, and for actuating the first transport mechanism so as to linearly translate the pivot point transverse of the weld seam; and
  a third motorized transport mechanism connected to the main carriage for vertically displacing the welding torch relative to the weld seam; wherein
    the controller is operative to actuate the first, second and third transport mechanisms simultaneously in order to effect a pre-determined trajectory and angular orientation of the torch relative to one the vertical or transverse directions; and wherein
      the controller receives feedback as to a welding current and welding voltage and actuates the third transport mechanism so as to effect a pre-determined minimum heat input into the weld seam.

10. The apparatus of claim 9, wherein the controller prioritizes the function of effecting said pre-determined minimum heat input over the function of following said pre-determined trajectory for the pivoting point of the torch.

11. The apparatus of claim 9 wherein the third transport mechanism includes:
  a carriage connected to the welding torch,
  a motor for providing the driving force to effect the vertical displacement of the welding torch, and
  a frame for supporting the motor, the frame being connected to the main carriage;
  the carriage being slidably mounted to the frame and vertically translatable relative to the main carriage in a direction perpendicular to the pipe sections to be welded.

12. The apparatus of claim 11 wherein the carriage has guide means fixed thereto, the guide means being slidably mounted to the frame.

13. The apparatus of claim 12 wherein the third transport mechanism includes driving means interconnecting the motor and the carriage.

14. The apparatus of claim 13 wherein the driving means include:
  a cog rotatably mounted to the motor for transmitting the driving force of the motor; and
  a cog pulley rotatably connected to the cog and mounted to extend through the frame; the cog pulley including a threaded shaft rotatable about the frame; the carriage having a threaded bore; the bore being adapted to receive the threaded shaft;
  the cog pulley being adapted to receive the driving force of the motor and to rotate the shaft within the bore; the carriage being adapted to travel vertically along the shaft when the motor is actuated.

15. The apparatus of claim 11 wherein:
  the first transport mechanism has a motor-driven carriage that is translatable relative to the main carriage in a direction transverse of the weld seam;
  the frame of the third transport mechanism being fixed to the carriage of the first transport mechanism.

16. The apparatus of claim 15 wherein:
  the second transport assembly mechanism has a frame and a mount connected thereto to support the welding torch;
  the frame of the second transport mechanism being pivotally connected to the carriage of the third transport mechanism.

17. The apparatus of claim 11 wherein:
  the frame of the third transport assembly mechanism is fixed to the main carriage; and
  the first transport mechanism has a motor-driven carriage that is translatable relative to the main carriage in a direction transverse of the weld seam;
  the carriage of the first transport mechanism being fixed to the frame of the third transport mechanism.

18. The apparatus of claim 17 wherein:
  the second transport mechanism has a frame and a mount connected thereto to support the welding torch;
  the frame of the second transport mechanism being pivotally connected to the carriage of the first transport mechanism.

* * * * *